(12) United States Patent
Cameron et al.

(10) Patent No.: US 11,750,537 B2
(45) Date of Patent: Sep. 5, 2023

(54) EVALUATING DIGITAL MEDIA PROFICIENCY UTILIZING DIGITAL MEDIA BOTS WITHIN A SOCIAL NETWORKING PLATFORM

(71) Applicant: SoLit 101, LLC, Sandy, UT (US)

(72) Inventors: Jordan Kevin Cameron, Sandy, UT (US); Emily Vranes Cameron, Sandy, UT (US); Bryceson Vranes Ringwood, Sandy, UT (US); Curtis Lee Wichern, Sandy, UT (US); Franklin Alan Fullmer, Cedar Hills, UT (US)

(73) Assignee: SoLit 101, LLC, Sandy, UT (US)

( * ) Notice: Subject to any disclaimer, the term of this patent is extended or adjusted under 35 U.S.C. 154(b) by 349 days.

(21) Appl. No.: 17/188,168

(22) Filed: Mar. 1, 2021

(65) Prior Publication Data
US 2022/0278947 A1 Sep. 1, 2022

(51) Int. Cl.
*G06F 15/16* (2006.01)
*H04L 51/02* (2022.01)
*G06F 11/34* (2006.01)
*H04L 51/52* (2022.01)

(52) U.S. Cl.
CPC .......... *H04L 51/02* (2013.01); *G06F 11/3428* (2013.01); *H04L 51/52* (2022.05)

(58) Field of Classification Search
CPC ....... H04L 51/02; H04L 51/52; G06F 11/3428
USPC .......................... 709/206, 204, 203, 201, 217
See application file for complete search history.

(56) References Cited

U.S. PATENT DOCUMENTS

| | | | |
|---|---|---|---|
| 10,957,086 B1* | 3/2021 | Mathon | G06Q 30/0201 |
| 11,005,843 B1* | 5/2021 | Sagduyu | H04L 51/046 |
| 2012/0253858 A1 | 10/2012 | Glissmann et al. | |
| 2012/0254760 A1* | 10/2012 | Meeker | G06F 16/958 |
| | | | 715/733 |

(Continued)

FOREIGN PATENT DOCUMENTS

JP 2013516002 A 5/2013

OTHER PUBLICATIONS

International Search Report & Written Opinion as received in PCT/US2022/070875 dated Jun. 17, 2022.

*Primary Examiner* — Kaylee J Huang
(74) *Attorney, Agent, or Firm* — Keller Preece PLLC

(57) ABSTRACT

This disclosure describes methods, non-transitory computer readable storage media, and systems that generate digital content for users to access in a social networking platform and detect user interactions with such digital content as part of user-interaction evaluations to determine the users' digital media literacy. For instance, the disclosed systems receive a request to initiate a user-interaction evaluation in a social networking platform. In response to the request, the disclosed systems generate digital content (e.g., social networking posts from a digital media bot) as part of the user-interaction evaluation for users to access in the social networking platform. The disclosed systems further detect interactions by user accounts with the digital content within the social networking platform and then generate digital-media-proficiency metrics for the users based on the interactions. The disclosed systems accordingly determine digital media proficiency of the users according to the user-interaction evaluations by leveraging targeted digital content.

20 Claims, 11 Drawing Sheets

(56) References Cited

U.S. PATENT DOCUMENTS

| | | | |
|---|---|---|---|
| 2013/0317808 A1* | 11/2013 | Kruel | H04L 51/52 |
| | | | 704/9 |
| 2015/0356261 A1 | 12/2015 | Brust et al. | |
| 2016/0018972 A1 | 1/2016 | Merkin | |
| 2018/0143950 A1* | 5/2018 | al-Arnaouti | G06Q 50/01 |
| 2018/0268337 A1* | 9/2018 | Miller | G06Q 10/109 |
| 2018/0341716 A1 | 11/2018 | Iyer | |

* cited by examiner

EVALUATING DIGITAL MEDIA PROFICIENCY UTILIZING DIGITAL MEDIA BOTS WITHIN A SOCIAL NETWORKING PLATFORM

BACKGROUND

Technological advances in network communications and computing device capabilities have increased the availability and access to many different types of digital media services. For example, many online systems include social networking platforms for users to interact with each other in an open digital format with users independently selecting or prohibiting certain types of network communications. Such social networking platforms allow users to communicate with each other by sending messages, sharing digital media, and interacting with digital content generated by other users.

Because social networking platforms provide users with many different digital mediums to interact with many other users, such platforms often capture or otherwise record a significant amount of personal data input by users within the online system(s) and/or by the users of the social networking platforms. To illustrate, many social networking platforms provide various digital exchange mediums through which users provide a number of personal details. For instance, social networking platforms often include user profiles and posting functions through which (i) users share sensitive content with other users or with the social networking platform or (ii) users directly interact with each other. Accordingly, existing social networking platforms provide various digital mediums or exchanges through which users can disclose or otherwise compromise the security of personal data or also exhibit bully-like, risky, or other behavior that can be digitally stored, recovered, or used to exploit the unwitting or uncareful user.

To improve the security and privacy of user personal data and recorded network actions, existing online systems typically include security or privacy settings to control various aspects of user information within the social networking platforms. For example, many online systems include tools for users to restrict information from being accessible to specific users or limit access to the information to a specific set of users, such as by limiting access to specific information to a friend list. While these systems provide controls for establishing custom privacy/security measures for user accounts, the controls are often complex and/or difficult to navigate. Indeed, some social networking platforms include controls purposefully designed to inhibit users from limiting access to personal information. Furthermore, many users are uninformed about the different ways that other users or third-party platforms can access their data and distribute the data to unintended audiences, which results in many users never setting or even accessing the privacy/security settings for their user accounts.

In addition to user-controlled settings, some existing online systems that implement social networking platforms include security protocols that prevent access to user data and certain actions within the platforms by external servers, software programs, or other entities. For example, these existing systems prevent bots (e.g., software programs that perform certain tasks) or other external entities from accessing user data or from performing specific social networking actions to protect user data. Third-party systems that provide user security analysis (or similar services) may be incapable of accessing sufficient data to accurately assess security risks to users based on their online behaviors or security settings based only on a temporary snapshot of available data at a particular time. Thus, the existing online systems further limit the availability of resources to which users have access to improve the security of their data.

SUMMARY

This disclosure describes one or more embodiments of systems, methods, and non-transitory computer readable storage media that provide benefits and/or solve the foregoing problems in the art. For instance, the disclosed system generates digital content for users to access in a social networking platform and detects user interactions with such digital content as part of user-interaction evaluations to determine the users' digital media literacy. In particular, the disclosed system receives a request to initiate a user-interaction evaluation in a social networking platform. In response to the request, the disclosed system generates digital content (e.g., social networking posts, direct messages) and detects interactions by user accounts with the digital content within the social networking platform. In some cases, the disclosed system initiates the user-interaction evaluation with a digital media bot and likewise generates the digital content by executing the digital media bot. Based on the interactions between the user accounts and the digital content, the disclosed system generates digital-media-proficiency metrics for the users. The disclosed system accordingly determines digital media proficiency of the users according to the user-interaction evaluations by leveraging interactions with targeted digital content.

BRIEF DESCRIPTION OF THE DRAWINGS

Various embodiments will be described and explained with additional specificity and detail through the use of the accompanying drawings in which.

DETAILED DESCRIPTION

Figure 1:
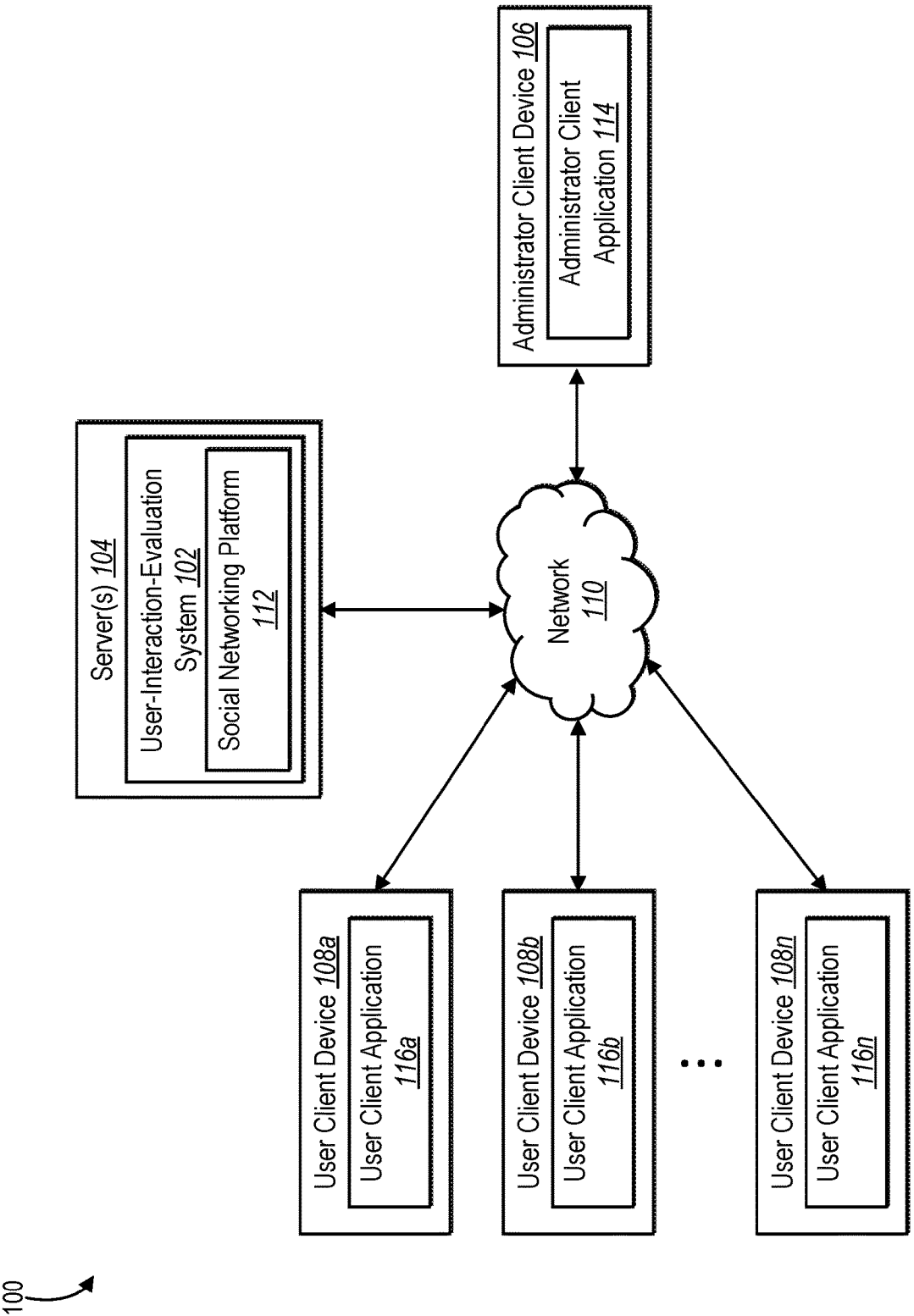
FIG. 1 illustrates a schematic diagram of a system environment in which a user-interaction-evaluation system operates in accordance with one or more implementations.

This disclosure describes one or more embodiments of a user-interaction-evaluation system that launches a user-interaction evaluation using targeted digital content within a social networking platform and detects (and scores) user interactions with such digital content to evaluate users' digital media literacy. Specifically, in some embodiments, the user-interaction-evaluation system receives a request to initiate a user-interaction evaluation to determine the digital media proficiency of users in a social networking platform. As part of the user-interaction evaluation, for example, the user-interaction-evaluation system generates targeted digital content and/or performs targeted digital media actions for users to access within the social networking platform. Additionally, the user-interaction-evaluation system detects interactions between user accounts associated with users of the social networking platform and the targeted digital content. Based on the detected interactions within the social networking platform, the user-interaction-evaluation system then generates digital-media-proficiency metrics for the users to indicate the digital literacy of the users.

As mentioned, in some embodiments, the user-interaction-evaluation system receives a request to initiate a user-interaction evaluation. For example, the user-interaction-evaluation system receives a request from an administrator client device to initiate one or more user-interaction evaluations that measure digital media proficiency of users via a social networking platform. Specifically, the user-interaction-evaluation system can provide a plurality of available content or interaction lessons (or other user-interaction evaluations) to the administrator client device for evaluating user proficiency with respect to different types of possible user interactions within a social networking platform. The user-interaction-evaluation system then receives a request to generate digital content as part of one or more user-interaction evaluations. For instance, the user-interaction-evaluation system can receive a request to initiate a digital media bot to perform one or more actions within the social networking platform.

After receiving the request to initiate a selected user-interaction evaluation, in one or more embodiments, the user-interaction-evaluation system generates digital content (e.g., social networking posts, direct messages) as part of the user-interaction evaluation within the social networking platform. For instance, the user-interaction-evaluation system generates a social networking post or performs one or more actions within the social networking platform using a bot account associated with a digital media bot. Alternatively, the user-interaction-evaluation system generates targeted digital content utilizing another software program or process. The user-interaction-evaluation system can then provide the digital content to one or more user accounts (or otherwise make the social networking post available for access by the user accounts) within the social networking platform.

When introducing targeted digital content or otherwise initiating a user-interaction evaluation, in some embodiments, the user-interaction-evaluation system detects interactions between user accounts and the digital content within the social networking platform. For example, the user-interaction-evaluation system can detect interactions between user accounts and digital content generated as part of a user-interaction evaluation. As noted above, the user-interaction-evaluation system sometimes detects interactions between user accounts and digital content that is generated by executing a digital media bot. Additionally, the user-interaction-evaluation system can detect interactions between user accounts and other user accounts (e.g., with digital content generated by the other user accounts). Specifically, the user-interaction-evaluation system can detect user interactions to reply to digital content, associate with digital content or user accounts/bot accounts (e.g., like, favorite, follow), send messages to other user accounts, share digital content, etc.

Based on the detected user interactions, in one or more embodiments, the user-interaction-evaluation system generates a digital-media-proficiency metric for each user of the social networking platform. Specifically, the user-interaction-evaluation system generates the digital-media-proficiency metric for a user based on the interactions between a corresponding user account of the user and digital content (e.g., generated as part of a user-interaction evaluation, by a digital media bot, or by other user accounts) within the social networking platform. For instance, the user-interaction-evaluation system determines interaction scores based on content scores for the digital content and interaction weights for the specific interaction. To illustrate, the user-interaction-evaluation system determines whether the interactions are good interactions or bad interactions based on the type of content and the type of interactions, such as by determining a degree to which an interaction increases or decreases a security risk of disclosing sensitive information for the user or determining a degree to which an interaction presents or suggests harmful content to the user.

In addition (or in the alternative) to accounting for a type of user interaction, in certain implementations, the user-interaction-evaluation system generates the digital-media-proficiency metric based on the digital content. In particular, the user-interaction-evaluation system can generate content scores for digital content generated by the user accounts and other information provided to the user-interaction-evaluation system by the user accounts. In some embodiments, the user-interaction-evaluation system generates content scores for profile data (e.g., bio, picture), user account settings, or other information that the user-interaction-evaluation system provides to the user-interaction-evaluation system. The user-interaction-evaluation system can then generate the digital-media-proficiency metrics for the users based on the user's interaction scores and content scores.

The disclosed user-interaction-evaluation system can provide a number of technical improvements to computing devices that implement social networking platforms. For example, the user-interaction-evaluation system improves conventional systems' flexibility by integrating a social networking platform with a digital media literacy system that utilizes digital media bots or other targeted software to evaluate users' digital media proficiency with targeted digital content. As previously mentioned, conventional systems often restrict users from accessing certain information or protect users from actions by bots and external entities. By contrast, the user-interaction-evaluation system integrates digital media bots (or other software mimicking security-compromising or malicious behavior) into a social networking platform in connection with user-interaction evaluations for determining digital media proficiency of its users. The user-interaction-evaluation system can evaluate such digital media proficiency—and customize bot-generated content to test or improve such proficiency—by generating digital-media-proficiency metrics based on interactions between user accounts and digital content generated by executing a digital media bot.

By integrating the digital media bots or other software mimicking evaluation-targeted behavior into the social networking platform, the user-interaction-evaluation system can introduce users of the social networking platform to different (and targeted) digital media scenarios that form the bases for the user-interaction-evaluation system evaluating the users' proficiency in various areas of digital media. For instance, the user-interaction-evaluation system can execute digital media bots to generate social networking posts or messages and/or interact with user accounts in numerous ways while monitoring interactions by the user accounts with the digital content from the digital media bots.

In addition to integrated bots and targeted digital content for improved training, the user-interaction-evaluation system improves the security of computing systems that implement social networking platforms. In particular, the user-interaction-evaluation system generates digital content (e.g., via digital media bots) and monitors user interactions with the digital content to determine a proficiency of the users with respect to security or privacy settings within a digital media platform. For instance, the user-interaction-evaluation system can utilize a closed social networking platform to process digital content by users and digital interactions between users within the closed social networking platform without exposing the users to security risks typical to conventional systems. While existing online systems use conventional security tools to protect and insulate users from malicious bots or other data security risks, the user-interaction-evaluation system introduces a unique and improved digital training environment to target users with digital content to simulate malicious or risky user interactions for digital literacy.

By utilizing digital media bots to introduce users to different scenarios within a social networking platform, the user-interaction-evaluation system also helps users improve the security of their personal data when establishing user profiles, providing data to social networking platforms, and interacting with other users. To illustrate, the user-interaction-evaluation system provides users with information indicating the effect of different account settings within a social networking platform that the users may not otherwise be able to obtain without the integrated social networking platform and digital media literacy system.

As illustrated by the foregoing discussion, the present disclosure utilizes a variety of terms to describe features and advantages of the user-interaction-evaluation system. Additional detail is now provided regarding the meaning of such terms. As used herein, the term "social networking platform" refers to a digital platform that provides social networking services to computing devices associated with users. In one or more embodiments, a social networking platform includes social networking services for anonymous media sharing. A social networking service may be individual-centered or group-centered. In particular, a social networking platform includes a network that allows users to connect with other users (e.g., friends, associates) and communicate with each other. For example, a user of a social networking platform can create social network posts to share with other users connected to the user. Additionally, the user can view social network posts of other users, such as within a social network feed. In one or more embodiments, the social networking platform is a "closed social networking platform" accessible only to a predefined set of users, such as people in an educational environment (e.g., students and teacher(s) in a school class) and people in a corporate environment (e.g. employees and executives of the same company). Accordingly, people outside the predefined set of users are unable to sign up for the social networking platform or otherwise access the social networking platform.

As used herein, the term "user-interaction evaluation" refers to both information and a process for implementing a set of instructions to evaluate a digital media literacy of users within a digital media platform. For example, a user-interaction evaluation includes a software process associated with a topic and a set of criteria for evaluating a plurality of users with respect to one or more aspects of the topic. In one or more embodiments, a user-interaction evaluation includes a plurality of software processes for analyzing user knowledge and abilities with respect to security and privacy settings within a social networking platform, user interactions with others within the social networking platform, external entities (including, but not limited to, advertising), or other possible actions within the social networking platform. To illustrate, topics for user-interaction evaluations can include, but are not limited to, login credentials (e.g., username/password), user agreements, profile data (e.g., bio, picture), or best practices for interacting on social media. Also as used herein, the term "digital media proficiency" refers to knowledge and abilities of a user related to one or more topics associated with a user-interaction evaluation.

As used herein, the term "digital media bot" refers to a software program or process for automatically performing one or more actions within a social networking platform as part of a user-interaction evaluation. Specifically, a digital media bot can interact with user accounts of a social networking platform. For example, a digital media bot can generate social networking posts to send to one or more user accounts of a social networking platform. Additionally, a digital media bot can interact with digital content (e.g., social networking posts) generated by other user accounts. In one or more embodiments, a digital media bot may include an artificial intelligence service or other software algorithm for dynamically interacting with users based on user account settings associated with the users or based on digital content generated by the users. In some embodiments, digital media bots also interact with each other via the social networking platform, such as by sending social networking posts to each other and replying to social networking posts generated by digital media bots.

Furthermore, as used herein, the term "bot account" refers to an account, which may or may not be registered, associated with a digital media bot in a social networking platform. For example, a bot account includes a profile in the social networking platform for a digital media bot. Additionally, a digital media bot performs actions within the social networking platform via a corresponding bot account, similar to a user performing actions within the social networking platform via a corresponding user account. Additionally, as used herein, the term "user account" refers to a registered account associated with a user in a social networking platform. Thus, in one or more embodiments, a user account includes a profile in the social networking platform for a user, and the user performs actions within the social networking platform via the user account.

As used herein, the term "digital content" refers to computer representations of media. For example, digital content can include text, images, video, or audio within a digital environment. In one or more embodiments, digital content includes media uploaded by a user (e.g., a user client device) to a social networking platform for providing access to the media to one or more other users (e.g., via one or more other user client devices). Additionally, digital content can include information provided by a user to a social networking platform including, but not limited to, profile data or user account settings. In one or more embodiments the digital content may be generated organically (by other users or administrators), by an artificial intelligence service or other software algorithm, or by pulling previously defined content from a data storage service, such as a database, flat file, etc.

As used herein, the term "digital media action" refers to an operation performed by a digital media bot or a user account relative to digital content or other accounts within a social networking platform. In one or more embodiments, a digital media action includes an operation to respond to digital content, associate with digital content, sharing the digital content, subscribe to receive content from a user account, or other interactions that bot accounts or user accounts may perform within the social networking platform.

As used herein, the term "digital-media-proficiency metric" refers to a quantitative measurement or score of digital media proficiency and/or literacy of a user within a social networking platform based on one or more criteria. For example, a digital-media-proficiency metric can include a measurement of a user's understanding of security or privacy settings within a social networking system. A digital-media-proficiency metric can also include a measurement of a user's understanding of the effects or appropriateness of interacting with other users within a social networking system. Accordingly, as used herein, the term "interaction score" refers to a measurement representing a value of an interaction by a user relative to digital content or other users within a social networking platform. Additionally, the term "content score" refers to a measurement representing a value of digital content generated or provided to a social networking platform by a user, a bot, or the social networking platform.

Turning now to the figures, FIG. 1 includes an embodiment of a system environment 100 in which a user-interaction-evaluation system 102 operates. In particular, the system environment 100 includes server device(s) 104, an administrator client device 106, and user client devices 108a-108n in communication via a network 110. Moreover, as shown, the user-interaction-evaluation system 102 on the server device(s) 104 includes a social networking platform 112. Additionally, the administrator client device 106 includes an administrator client application 114, and the user client devices 108a-108n include user client applications 116a-116n.

As shown in FIG. 1, the server device(s) 104 include or host the user-interaction-evaluation system 102. Specifically, the user-interaction-evaluation system 102 includes, or is part of, one or more systems that manage educational or instructional software. For instance, the user-interaction-evaluation system 102 can be part of a system that manages educational software for schools or other educational institutions. The user-interaction-evaluation system 102 can also be part of a system that manages instructional software for business entities. In one or more embodiments, the user-interaction-evaluation system 102 includes the social networking platform 112 for utilizing with the educational or instructional software in providing education regarding privacy and security within a social networking environment.

To illustrate, the user-interaction-evaluation system 102 can manage the security and privacy of user data in the social networking platform 112. For example, the user-interaction-evaluation system 102 provides tools for an administrator of the social networking platform 112 to monitor user settings and user behavior within the social networking platform 112. In one or more embodiments, the user-interaction-evaluation system 102 includes a plurality of user-interaction evaluations corresponding to a plurality of different topics related to social networking for providing education or instruction to a plurality of users (e.g., users associated with the user client devices 108a-108n). Additionally, in one or more embodiments, the user-interaction-evaluation system 102 includes (or accesses from an external system) digital media bots to utilize as part of one or more user-interaction evaluations.

According to one or more embodiments, the social networking platform 112 includes a social networking environment by which a plurality of users can generate digital content and interact with each other or digital content of other users. Specifically, the user-interaction-evaluation system 102 can register users with user accounts for the social networking platform 112 by which the users interact with each other. Additionally, the user-interaction-evaluation system 102 can create bot accounts for digital media bots to use to perform actions within the social networking platform 112.

In one or more embodiments, the social networking platform 112 is a closed social networking platform that provides access only to a predefined set of users determined by the user-interaction-evaluation system 102, such as a set of users in an educational/instructional group (e.g., students) or employees of a business. In such embodiments, the user-interaction-evaluation system 102 can control all aspects of the social networking platform 112 and prevent outside access to the social networking platform 112. Additionally, in one or more embodiments, the social networking platform 112 is limited to access by the user client devices 108a-108n over a local area network. Additionally, the user-interaction-evaluation system 102 may limit access to the social networking platform 112 over the internet by the administrator client device 106. Furthermore, the user-interaction-evaluation system 102 can delete all digital content generated by users after completion of one or more user-interaction evaluations.

According to one or more embodiments, the user-interaction-evaluation system 102 manages communications sent to the social networking platform 112 or communications sent between client devices via the social networking platform 112. For instance, the user-interaction-evaluation system 102 can receive data from the user client devices 108a-108n to provide information to the social networking platform 112, generate digital content on the social networking platform 112, or interact with other users (e.g., via corresponding user client devices) or digital content using the social networking platform 112. Additionally, the user-interaction-evaluation system 102 can utilize data received from the user client devices 108a-108n to determine a digital media proficiency of each user of the social networking platform 112. The user-interaction-evaluation system 102 can also provide data received from the user client devices 108a-108n to the administrator client device 106.

Furthermore, the user-interaction-evaluation system 102 can provide management of educational or instructional software for a plurality of different sets of administrator/users. To illustrate, the user-interaction-evaluation system 102 can provide a separate instance of the social networking platform 112 (or separate social networking platforms) to each set of administrator client devices and user client devices. More specifically, the user-interaction-evaluation system 102 can provide a first instance of the social networking platform 112 to the administrator client device 106 and the user client devices 108a-108n. The user-interaction-evaluation system 102 can provide a second instance of the social networking platform 112 to a different administrator client device and different user client devices. Each set of administrator/users can thus access only the instance of the social networking platform 112 provided by the user-interaction-evaluation system 102.

In one or more embodiments, the server device(s) 104 include a variety of computing devices, including those described below with reference to FIG. 6. For example, the server device(s) 104 includes one or more servers for storing and processing data associated with user-interaction evaluations and the social networking platform 112. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the administrator client device 106 and the user client devices 108a-108n. In one or more embodiments, each of the administrator client device 106 and the user client devices 108a-108n includes, but is not limited to, a mobile device (e.g., smartphone or tablet), a laptop, a desktop, including those explained below with reference to FIG. 6. Furthermore, although not shown in FIG. 1, each of the administrator client device 106 and the user client devices 108a-108n can be operated by a user (e.g., an administrator or a user included in, or associated with, the system environment 100) to perform a variety of functions. In particular, the administrator client device 106 and the user client devices 108a-108n perform functions such as, but not limited to, accessing, viewing, analyzing, and interacting with digital content within the social networking platform 112 via the administrator client application 114 and the user client applications 116a-116n, respectively. The administrator client device 106 also performs functions for viewing or otherwise accessing data associated with evaluating a digital media proficiency of users within a social networking environment of the social networking platform 112 as determined by the user-interaction-evaluation system 102. Although FIG. 1 illustrates the system environment 100 with a single administrator client device 106 and the user client devices 108a-108n, the system environment 100 can include a different number of administrator client devices or user client devices.

Additionally, as shown in FIG. 1, the system environment 100 includes the network 110. The network 110 enables communication between components of the system environment 100. In one or more embodiments, the network 110 may include the Internet or World Wide Web. In one or more embodiments, the network 110 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the administrator client device 106, and the user client devices 108a-108n communicate via the network 110 using one or more communication platforms and technologies suitable for transporting data and/or communication signals, including any known communication technologies, devices, media, and protocols supportive of data communications, examples of which are described with reference to FIG. 6.

Although FIG. 1 illustrates the server device(s) 104, the administrator client device 106, and the user client devices 108a-108n communicating via the network 110, in alternative embodiments, the various components of the user-interaction-evaluation system 102 communicate and/or interact via other methods (e.g., the server device(s) 104, the administrator client device 106, and the user client devices 108a-108n can communicate directly). Furthermore, although FIG. 1 illustrates the user-interaction-evaluation system 102 being implemented by a particular component and/or device within the system environment 100, the user-interaction-evaluation system 102 can be implemented, in whole or in part, by other computing devices and/or components in the system environment 100 (e.g., the administrator client device 106). Additionally, digital media bots that the user-interaction-evaluation system 102 utilizes may be implemented at the server device(s) 104 or at one or more other server devices or systems.

Figure 2:
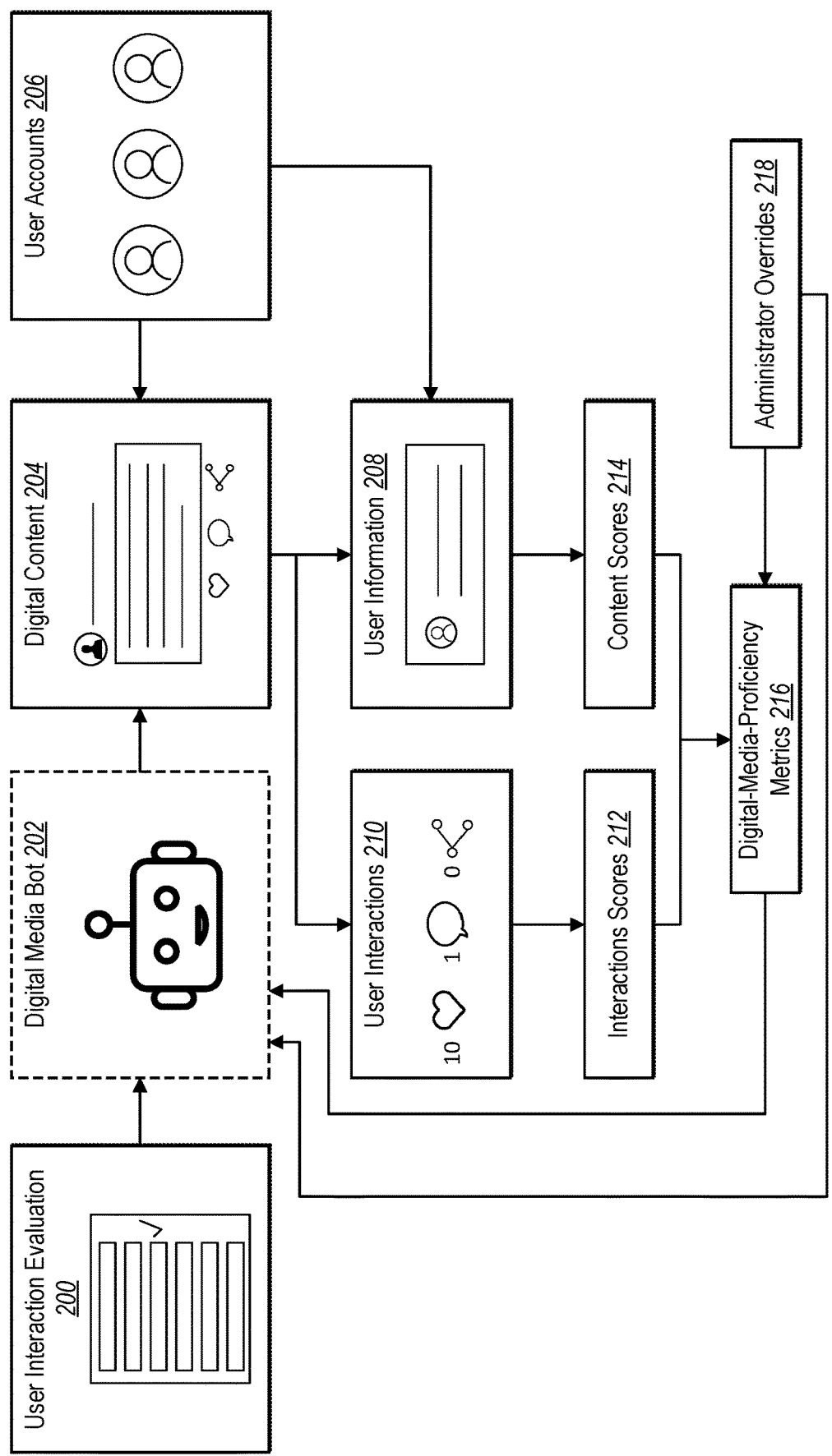
FIG. 2 illustrates an overview diagram of the user-interaction-evaluation system generating digital-media-proficiency metrics based on user interactions with digital content in accordance with one or more implementations.

As mentioned above, the user-interaction-evaluation system 102 manages privacy and security of user data for a plurality of users within a social networking platform. In one or more embodiments, the user-interaction-evaluation system 102 utilizes information about user data and user interactions within the social networking platform to determine the digital media proficiency of the users. For example, FIG. 2 illustrates that the user-interaction-evaluation system generates a plurality of digital-media-proficiency metrics for a plurality of users based on information provided by user accounts to the user-interaction-evaluation system 102 (e.g., within the social networking platform). More specifically, the user-interaction-evaluation system 102 utilizes information provided by the users in connection with using the social networking platform to generate digital content and interact with other users.

As shown in FIG. 2, the user-interaction-evaluation system 102 initiates a user-interaction evaluation 200 to determine the digital media proficiency of a plurality of users. In particular, the user-interaction evaluation 200 can correspond to a particular topic on user interactions or digital content in social networking and/or other online behavior. In one or more embodiments, the user-interaction-evaluation system 102 initiates a selected user-interaction evaluation (e.g., the user-interaction evaluation 200) from a plurality of available user-interaction evaluations corresponding to a plurality of different topics. The user-interaction-evaluation system 102 can initiate the user-interaction evaluation 200 to provide education or instruction materials to the users and/or to initiate one or more actions within a social networking platform.

FIG. 2 further illustrates that the user-interaction-evaluation system 102 optionally executes a digital media bot 202 as part of the user-interaction evaluation 200. For example, the user-interaction-evaluation system 102 can execute the digital media bot 202 to perform one or more actions associated with a topic of the user-interaction evaluation 200. In one or more embodiments, the digital media bot 202 may be associated with a bot account in the social networking platform. Accordingly, the user-interaction-evaluation system 102 can execute the digital media bot 202 to perform the one or more actions via the bot account. To illustrate, the user-interaction-evaluation system 102 can utilize the digital media bot 202 to generate digital content 204 to publish to the social networking platform. In some embodiments, the user-interaction-evaluation system 102 utilizes the digital media bot 202 to interact with users within the social networking platform.

In one or more embodiments, the digital media bot 202 includes a software process that functions independently from any user control (e.g., independently from an administrator). The digital media bot 202 can interact with user accounts by several methods including, but not limited to, sending direct messages, posting microblogs (including comments, replies, and images), interacting with microblogs (e.g., liking and sharing), posting notifications, submitting friend and follower requests, cloning accounts, phishing, extorting, and bullying of other bot accounts or other user accounts. Accordingly, the digital media bot 202 can interact with users and content within the social networking platform in a variety of ways according to user-interaction evaluations.

Each user-interaction evaluation can have one or more corresponding digital media bots that perform specific actions based on the topic of the user-interaction evaluation. Furthermore, each digital media bot can include, but is not limited to, the following elements that determine behavior of the digital media bot and other data associated with the digital media bot: whether the digital media bot is enabled, ID, type, news (digital media bot only displays notification posts), user (e.g., digital media bot has a bot account to interact with other users), username (applicable to user bots), and one or more actions that the digital media bot can perform. Furthermore, in one or more embodiments, a digital media bot includes data for (or associated with) initiating an action including, but not limited to, the following elements: whether the action is presently enabled (e.g., to prevent initiating an action twice), a trigger event indicating when to execute the action, a trigger event timestamp, a trigger delay to indicate how long to wait before executing the action, an action description, text and/or images associated with the action, and whether the action is executed to prevent a digital media bot from executing the action more than once.

Additionally, FIG. 2 shows that the user-interaction-evaluation system 102 includes user accounts 206 associated with a plurality of users. Specifically, the user accounts 206 can include accounts registered for a plurality of users of the social networking platform. For instance, the user-interaction-evaluation system 102 can create user accounts for a predefined set of users as determined by an administrator, such as students in a class. In one or more embodiments, the user-interaction-evaluation system 102 creates user accounts for the users as part of the user-interaction evaluation 200. To illustrate, the user-interaction evaluation 200 can include instructions for generating the user accounts 206. The user-interaction-evaluation system 102 can then require the users to generate the user accounts 206 by providing specific information to the user-interaction-evaluation system 102.

As further shown in FIG. 2, in some embodiments, the user accounts 206 contribute to the digital content 204. For example, computing devices associated with the user accounts 206 can generate social network posts, private messages, or other digital content (e.g., by corresponding users utilizing tools provided to user client devices). The user accounts 206 can then provide the digital content 204 to the user-interaction-evaluation system 102 for publishing to the social networking platform. In one or more embodiments, the user-interaction-evaluation system 102 sends the digital content 204 from the user accounts 206 or from the digital media bot 202 to one or more other user accounts within the social networking platform.

FIG. 2 illustrates that, in addition to the user accounts 206 generating the digital content 204 via the user-interaction-evaluation system 102, computing devices associated with the user accounts 206 also provide user information 208 to the user-interaction-evaluation system 102. To illustrate, a computing device associated with a user account can provide the user information 208 for completing a profile associated with the user account (e.g., a profile bio and a profile pic). Additionally, the user information 208 can include user account settings that determine functionality, security, or content within the social networking platform for the user account. Thus, the user information 208 can include data that computing devices associated with the user accounts 206 provide to the user-interaction-evaluation system 102 and not to other user accounts within the social networking platform. As illustrated in FIG. 2, the user-interaction-evaluation system 102 can also include the digital content 204 generated by the user accounts 206 in the user information 208 for the user accounts 206.

FIG. 2 also illustrates that the user-interaction-evaluation system 102 detects user interactions 210 within the social networking platform. For instance, the user-interaction-evaluation system 102 can detect a user interaction by a computing device associated with a user account with the digital content 204 generated by another user account or by the digital media bot 202. To illustrate, the user-interaction-evaluation system 102 can detect interactions by the user accounts 206 to respond to, associate with, or share the digital content 204 within the social networking platform. Additionally, the user-interaction-evaluation system 102 can detect interactions by the user accounts 206 with respect to the digital media bot 202 or the user accounts 206.

FIG. 2 illustrates that the user-interaction-evaluation system 102 can also grade interactions or digital content within a social networking platform to determine digital media proficiency of the users. For example, the user-interaction-evaluation system 102 can generate interaction scores 212 for the user interactions 210 to indicate whether the user interactions 210 were good interactions, bad interactions, or neutral interactions. In one or more embodiments, the user-interaction-evaluation system 102 determines the interaction scores 212 based on a value of digital content associated with a user interaction and a value of the interaction relative to the digital content. To illustrate, a good interaction with certain digital content can result in a higher interaction score (e.g., indicating a good grade for the user), while a bad interaction with certain digital content can result in a lower interaction score (e.g., indicating a poor grade for the user).

Additionally, FIG. 2 illustrates that the user-interaction-evaluation system 102 can generate content scores 214 for the user information 208 associated with the user accounts 206. In one or more embodiments, the user-interaction-evaluation system 102 determines a content score for a digital content item (e.g., a social networking post or a private message) generated by a computing device associated with a particular user account. The content score can include a higher value (e.g., above a threshold) if the user-interaction-evaluation system 102 determines that the digital content item is good, while a lower value (e.g., below the threshold) indicates that the digital content item is not good. The user-interaction-evaluation system 102 can also process other user information—such as profile information, login credentials, or user account settings—to generate content scores for such information.

FIG. 2 shows that the user-interaction-evaluation system 102 also generates digital-media-proficiency metrics 216 for users to indicate a digital media proficiency for each user. Specifically, the user-interaction-evaluation system 102 can generate the digital-media-proficiency metrics 216 based on the interaction scores 212 and content scores 214 associated with the user accounts 206. In one or more embodiments, the user-interaction-evaluation system 102 generates a digital-media-proficiency metric for a particular user account based on a plurality of interaction scores and a plurality of content scores for the user-interaction evaluation 200 to indicate the proficiency of the user account with regard to a specific topic. The user-interaction-evaluation system 102 can also generate the digital-media-proficiency metric for the particular user account based on interaction scores and content scores for one or more additional user-interaction evaluations. Accordingly, the digital-media-proficiency metrics 216 can provide the user-interaction-evaluation system 102 with an indication of the overall digital media proficiency of the user accounts across a plurality of topics.

As further illustrated in FIG. 2, the user-interaction-evaluation system 102 can also utilize administrator overrides 218 to determine the digital-media-proficiency metrics 216. For example, in some embodiments, actions by the user accounts 206 can adversely affect the interaction scores 212 and/or the content scores 214, resulting in inaccurately determining the value of a given user interaction or digital content item. In such cases, an administrator can indicate to the user-interaction-evaluation system 102 that the interaction score or content score for the user interaction or digital content item is incorrect and provide an administrator override to set a new interaction score or content score. The user-interaction-evaluation system 102 can thus use the administrator overrides 218 to modify the corresponding interaction score or content score and update the digital-media-proficiency metrics 216 based on the updated score.

As illustrated in FIG. 2, the user-interaction-evaluation system 102 can send the digital-media-proficiency metrics 216 to the digital media bot 202 to cause the digital media bot 202 to perform one or more additional actions. For example, in response to the user-interaction-evaluation system 102 determining that the digital-media-proficiency metrics 216 are unacceptable (e.g., relative to one or more threshold metric values), the user-interaction-evaluation system 102 can utilize the digital media bot 202 to issue additional digital content to further instruct/educate users associated with the user accounts 206. To illustrate, in response to determining that the digital-media-proficiency metrics 216 indicate a poor performance or understanding of one or more users relative to a given topic, the user-interaction-evaluation system 102 can utilize the digital media bot 202 to generate additional digital content related to the topic.

Additionally, in one or more embodiments, the user-interaction-evaluation system 102 utilizes the administrator overrides 218 to cause the digital media bot 202 to directly control the digital content 204 that the digital media bot 202 generates and/or actions that the digital media bot 202 performs. For instance, the user-interaction-evaluation system 102 utilizes the administrator overrides 218 to generate certain types of digital content 204 or perform one or more specific types of actions related to one or more categories related to overridden metrics. To illustrate, in response to determining that users coordinated to manipulate a specific interaction score or content score, the user-interaction-evaluation system 102 utilizes the digital media bot 202 to generate additional digital content related to a corresponding interaction or content type to retrain users relative to the interaction/content type.

In some embodiments, the user-interaction-evaluation system 102 also utilizes information about a digital-media-proficiency metric of a user to further test or train the user on one or more topics within a separate environment that does not affect the overall digital-media-proficiency metric of the user. For instance, in response to determining that one or more components of the user's digital-media-proficiency metric not meeting a threshold, the user-interaction-evaluation system 102 can generate and provide additional digital content to the user account of the user within a separate instance of the social networking platform (e.g., a sandbox environment restricted to a single user account). Specifically, the user-interaction-evaluation system 102 can generate social networking posts to provide to the user account and/or provide user interfaces including various account settings to the user account. The user-interaction-evaluation system 102 can then monitor user interactions with the digital content and/or settings (in addition to other user interactions as described herein) to generate a separate digital-media-proficiency metric for the user based only on the user interactions within the separate instance of the social networking platform. Accordingly, the user-interaction-evaluation system 102 can further test a user's understanding of one or more topics without affecting the overall digital-media-proficiency metric of the user.

Figure 3A:
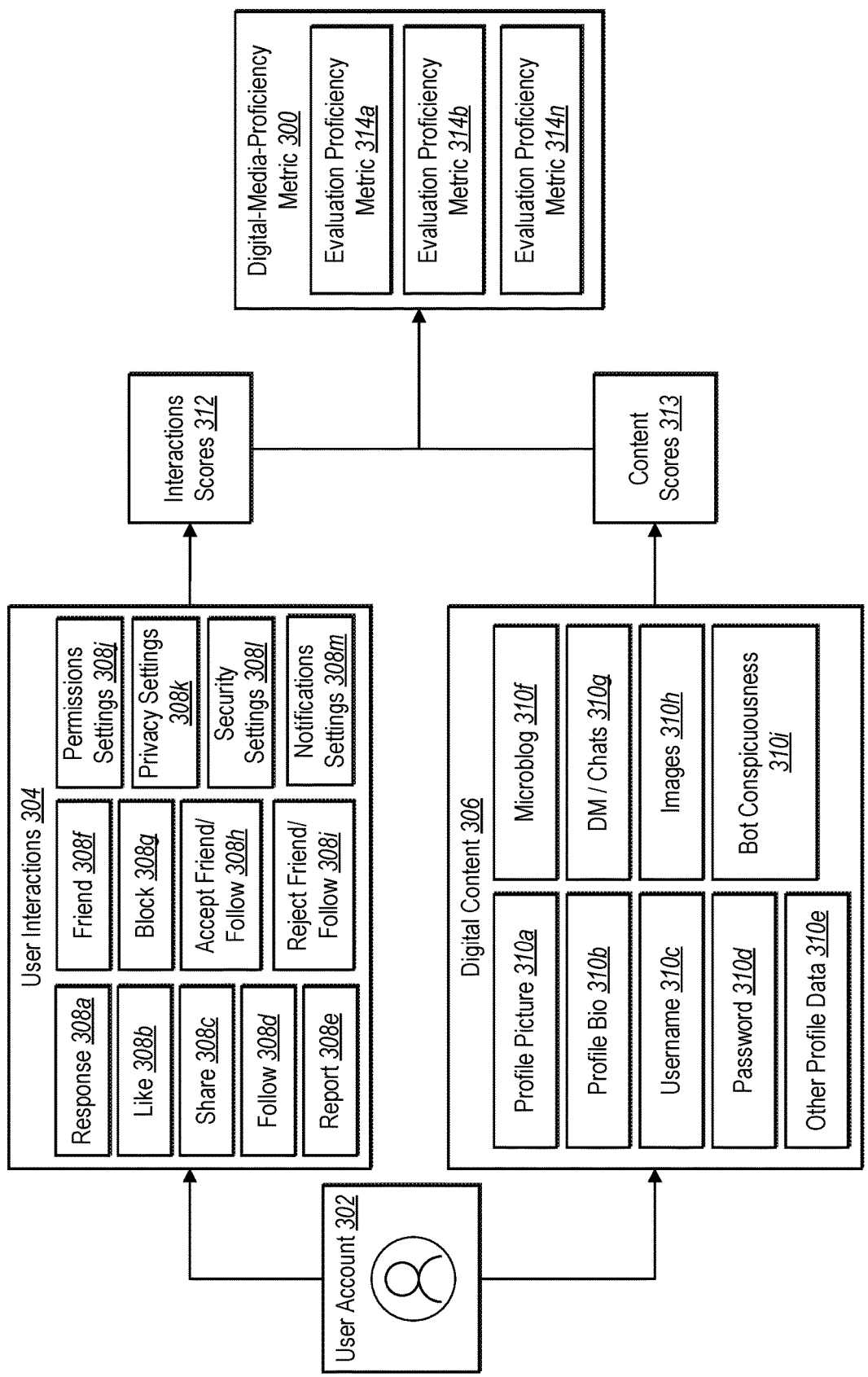
FIGS. 3A-3B illustrate diagrams of the user-interaction-evaluation system generating digital-media-proficiency metrics based on interaction scores and content scores in accordance with one or more implementations.
Figure 3B:
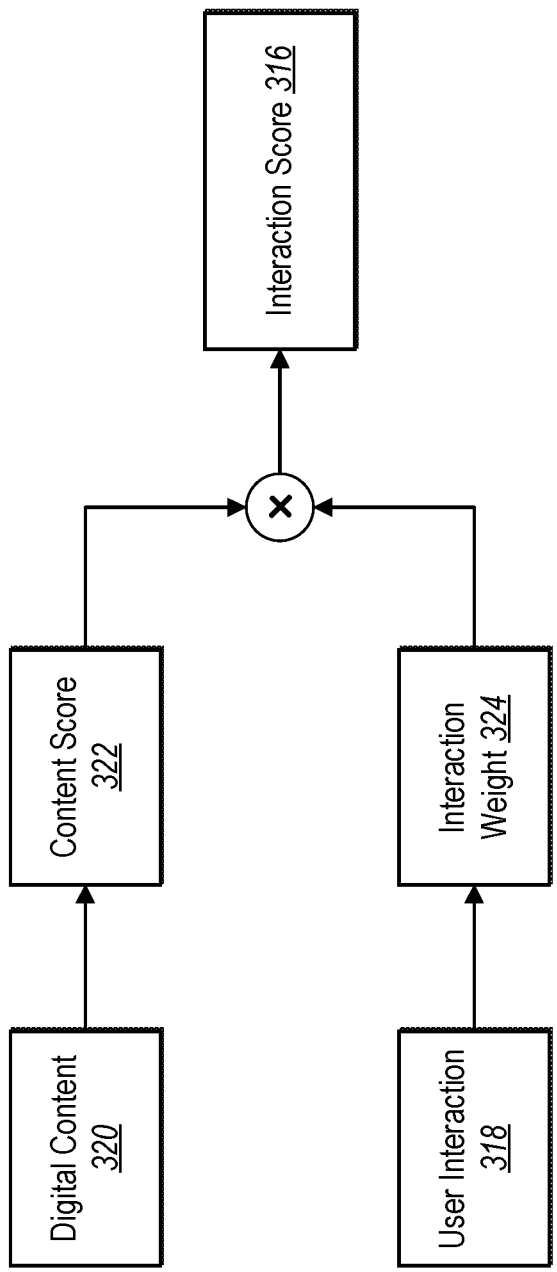

FIGS. 3A-3B illustrate additional detail with regard to the user-interaction-evaluation system 102 generating digital-media-proficiency metrics for user accounts based on user interactions and digital content within a social networking platform. Specifically, FIG. 3A illustrates that the user-interaction-evaluation system 102 generates a digital-media-proficiency metric for a particular user account based on user interactions and digital content corresponding to the user account. FIG. 3B illustrates how the user-interaction-evaluation system 102 generates interaction scores for user interactions based on the value of digital content and the value of each user interaction.

As illustrated in FIG. 3A, the user-interaction-evaluation system 102 generates a digital-media-proficiency metric 300 for a user account 302 of a social networking platform. For instance, the user-interaction-evaluation system 102 generates the digital-media-proficiency metric 300 to indicate a measurement of the digital media proficiency of a user associated with the user account 302 based on one or more user-interaction evaluations. More specifically, the user-interaction-evaluation system 102 can generate the digital-media-proficiency metric 300 to indicate the understanding and/or execution of concepts taught relative to one or more topics of the one or more user-interaction evaluations.

As mentioned previously, FIG. 3A further illustrates that the user-interaction-evaluation system 102 generates the digital-media-proficiency metric 300 based on user interactions 304 and digital content 306 associated with the user account 302. In one or more embodiments, the user-interaction-evaluation system 102 first detects the user interactions 304 by the user account 302 within the social networking platform. In addition to detecting the user interactions 304 by the user account 302, the user-interaction-evaluation system 102 also identifies the digital content 306 generated by the user account 302 within the social networking platform.

In one or more embodiments, the user interactions 304 include actions by the user account 302 to interact with digital content and/or accounts (e.g., user accounts or bot accounts) within the social networking platform. Specifically, the user-interaction-evaluation system 102 can detect that the user account 302 performs an action to select (e.g., view) a user/bot account, follow a user/bot account, add a user/bot account to a list of connections (e.g., a friend list), or hide or block a user/bot account. Additionally, the user-interaction-evaluation system 102 can detect that the user account 302 performs an action to view digital content, associate with digital content (e.g., "like" or "favorite" digital content), respond to digital content, share digital content, or otherwise interact with digital content (e.g., generated by another user/bot account or provided to the user account by the user-interaction-evaluation system 102). Accordingly, FIG. 3A illustrates examples of the user interactions 304 including, but not limited to, a response 308a, a like 308b, a share 308c, a follow 308d, a report 308e, a friend 308f (e.g., adding another user to a friend list), a block 308g, an accept friend/follow 308h (e.g., accepting another user's request to add to a friend list or follow), a reject friend/follow 308*i* (e.g., rejecting another user's request to add to a friend list or follow), permission settings 308*j*, privacy settings 308*k*, security settings 308*l*, or notification settings 308*m*.

As further illustrated by FIG. 3A, the user-interaction-evaluation system 102 identifies the digital content 306 generated by the user account 302 and provided to the social networking platform. For example, the user-interaction-evaluation system 102 can determine that the user account 302 provided information for populating a user profile for the user account 302 such as, but not limited to, a profile picture 310*a*, a profile bio 310*b*, a microblog 310*f*, direct messages/chats 310*f*, images 310*h* (e.g., images uploaded to the user account 302), or bot conspicuousness 310*i* (e.g., ease of detection of a digital media bot associated with an account and/or digital content generated by the digital media bot). Additionally, the user-interaction-evaluation system 102 can determine login credentials associated with the user account 302 in the social networking platform including a username 310*c* and a password 310*d*. The user-interaction-evaluation system 102 can also determine messages 310*e* generated by the user account 302 including, but not limited to, social networking posts published in a social networking feed of the user account 302, direct/private messages sent to other user accounts 302, or photos or videos generated by the user account 302 and shared with other user accounts. In additional embodiments, the user-interaction-evaluation system 102 identifies other profile data or digital content generated by the user account 302.

As shown in FIG. 3A, the user-interaction-evaluation system 102 then generates interaction scores 312 and content scores 313 based on the user interactions 304 and the digital content 306, respectively. In one or more embodiments, the user-interaction-evaluation system 102 generates the interaction scores 312 to represent measurements of the user interactions 304. For example, as previously indicated, each user interaction of the user interactions 304 can have a particular interaction value or quality indicating whether the interaction is good, bad, or neutral according to one or more user-interaction evaluations. To illustrate, the user-interaction-evaluation system 102 determines whether the response 308*a*, like 308*b*, share 308*c*, follow 308*d*, or report 308*e* is a good, bad, or neutral interaction relative to another user account, bot account, or digital content. In one or more embodiments, the user-interaction-evaluation system 102 generates content scores and interaction scores on numeric scales (e.g., from −10 to +10), alphabetic scales, alphanumeric scales, Boolean scales or other grading scales, in which negative values are indicative of bad content/interactions, a zero value is indicative of neutral content/interaction, and positive values are indicative of good content/interactions. The user-interaction-evaluation system 102 can thus determine the interaction scores 312 and the content scores 313 according to the determined quality of the user interactions/digital content.

In some embodiments, the user-interaction-evaluation system 102 generates interaction scores based on user interactions with digital content generated by user accounts or bot accounts. For instance, the user-interaction-evaluation system 102 can determine whether the interaction is good or bad based on the type of content. To illustrate, the user-interaction-evaluation system 102 can generate a content score based on the content and an interaction weight based on the type of interaction with the digital content. The user-interaction-evaluation system 102 can then determine an interaction score by combining the content score and interaction weight, as described in more detail with respect to FIG. 3B. The user-interaction-evaluation system 102 can store the digital content, the user interaction, the interaction score, and a timestamp for a corresponding user-interaction evaluation in a persistent storage.

According to one or more embodiments, the user-interaction-evaluation system 102 can generate interaction scores by processing information associated with the user interactions 304. For example, the user-interaction-evaluation system 102 generates an interaction score based on user acceptance of a user agreement. To illustrate, the user-interaction-evaluation system 102 can process the user's acceptance of a user agreement as a Boolean value. Additionally, the user-interaction-evaluation system 102 can determine an amount of time the user spent reading the user agreement and the scrolled percentage of the user agreement by the user as integers or floats/doubles. The user-interaction-evaluation system 102 can then utilize the acceptance Boolean value, reading time, and percentage read to generate the content score (e.g., by determining a product, addition, or other combination of the values) and then store the values along with the content score and a timestamp associated with a corresponding user-interaction evaluation in the persistent storage.

The user-interaction-evaluation system 102 can also generate a new content score for a user agreement in response to updating the user agreement. For example, the user-interaction-evaluation system 102 can provide, as part of a user-interaction evaluation, an instruction to the user account 302 to read and accept the updated user agreement. The user-interaction-evaluation system 102 can then generate a content score based on the read time, scroll percentage, and acceptance Boolean value and store the new data in the persistent storage for the corresponding user-interaction evaluation.

In one or more embodiments, the user-interaction-evaluation system 102 generates one or more interaction scores based on "likes and interests" or other associations by the user account 302 with digital content. For instance, the user-interaction-evaluation system 102 can generate an interaction score based on whether the user selected at least one "like" or "interest" for the user account 302. The user-interaction-evaluation system 102 can also utilize the total number of "likes" or "interests" to generate an interaction score. In some embodiments, the user-interaction-evaluation system 102 can also utilize a quality of digital content associated with the "like" or "interest" to generate the interaction score. The user-interaction-evaluation system 102 can then store the "likes" and "interests," interaction score, and timestamp for the corresponding user-interaction evaluation in the persistent storage.

In at least some embodiments, the user-interaction-evaluation system 102 also generates an interaction score based on a user reaction to a cloned account. To illustrate, the user-interaction-evaluation system 102 can utilize a digital media bot to clone the user account 302 within the social networking platform. The user-interaction-evaluation system 102 can then determine an amount of time between creation of the cloned account and a report time indicating that the user reported the cloned account. The user-interaction-evaluation system 102 can utilize the amount of time, as well as an indicator of whether the user reported the cloned account, to generate an interaction score based on the cloned account. The user-interaction-evaluation system 102 can store the time of creation of the cloned account, the timestamp when the user reported the cloned account, the interaction score, and the timestamp of the corresponding user-interaction evaluation in the persistent storage.

Additionally, the user-interaction-evaluation system 102 can generate interaction scores based on user account settings associated with a user account. For instance, the user-interaction-evaluation system 102 can determine whether a user has selected specific settings (e.g., security settings) within the user account settings. In response to determining that the user has selected the settings (e.g., by enabling certain account security settings such as two-factor authentication), the user-interaction-evaluation system 102 can generate an interaction score indicating that the user has selected the settings.

In one or more embodiments, the user-interaction-evaluation system 102 generates the content scores 313 to represent measurements of the digital content 306. For instance, the user-interaction-evaluation system 102 determines a value or quality of the digital content 306 indicating whether the digital content is good, bad, or neutral according to the one or more user-interaction evaluations. In particular, the user-interaction-evaluation system 102 determines whether the profile picture 310a, profile bio 310b, username 310c, password 310d, or messages 310e are good, bad, or neutral digital content items within the social networking platform. Accordingly, the user-interaction-evaluation system 102 determines the content scores 313 according to the determined quality of the digital content 306.

According to some embodiments, the user-interaction-evaluation system 102 generates digital content scores by processing the digital content 306 according to a content type. Specifically, the user-interaction-evaluation system 102 analyzes different content types according to different scoring methods. For example, to generate a content score (e.g., a text score) for some or all text a user enters into the social media platform, including username, the user-interaction-evaluation system 102 can process the text as a character string. To illustrate, the user-interaction-evaluation system 102 can search the text string and compare each character substring with a persistent storage of problematic (e.g., disallowed) character strings. The user-interaction-evaluation system 102 can also extract substrings of upper and lower case characters (e.g., for "AfPrPeLdE," the user-interaction-evaluation system extracts "APPLE" and "fred") and compare those substrings with the problematic character strings in the persistent storage. In additional examples, the user-interaction-evaluation system 102 can identify common alternative characters or spellings (e.g., l33tspeak, swapping numbers for letters, and pseudo text like characters from other alphabets that look like English characters). The user-interaction-evaluation system 102 can then generate a content score indicating the presence of any problematic character strings for the text, such as by reducing an initial score for the text by an amount based on the number or type of problematic character string. Additionally, the user-interaction-evaluation system 102 can store the text, problematic strings, content score, and a timestamp of this entry in the persistent storage.

In some embodiments, the user-interaction-evaluation system 102 generates a content score for a password by processing the password as a character string. For example, the user-interaction-evaluation system 102 can use internal and/or external libraries to determine the length of time required to crack the password; the length of the password character string; identify the existence of common phrases in the password; whether the password contains runs of the same character; and whether the password includes a variety of upper/lower case characters, numbers, or symbols. The user-interaction-evaluation system 102 can thus determine an overall password strength for the password. Furthermore, the user-interaction-evaluation system 102 can store the password, password strength (including crack time, length, and character analysis), the content score (e.g., based on the password strength), and a timestamp of this entry in the persistent storage.

In one or more embodiments, the user-interaction-evaluation system 102 can further re-evaluate the password each time the user changes or updates the password. For example, the user-interaction-evaluation system 102 can provide additional user-interaction evaluations that include instructions indicating to change the password (e.g., by instructing the user that the password has been compromised). The user-interaction-evaluation system 102 can compare a timestamp of a notification sent to the user to change the password and a timestamp for when the user changed the password. The user-interaction-evaluation system 102 can store the password/notification timestamps, content score (e.g., based on the password strength and timestamps) for the updated password, and a timestamp for this entry in the persistent storage. In additional embodiments, the user-interaction-evaluation system 102 modifies criteria for scoring updated passwords to emphasize that the updated password needs a higher password strength.

In one or more embodiments, the user-interaction-evaluation system 102 also generates a content score for a profile picture in a profile of a user account. For instance, the user-interaction-evaluation system 102 determines whether the user chose an avatar or a personal picture during creation of the user account. To illustrate, the user-interaction-evaluation system 102 can generate a content score for the profile picture by increasing or reducing a base score based on the type of profile picture. The user-interaction-evaluation system 102 can also take into account the time between account creation (or chose an avatar) and when the user uploaded a personal picture when generating the content score. The user-interaction-evaluation system 102 can also modify the content score if the user removes a profile picture or uploads a new profile picture (or changes to an avatar). Additionally, the user-interaction-evaluation system 102 can store an account creation timestamp, type of profile picture (if any), timestamps of picture removal/change and a timestamp for this entry in the persistent storage.

In additional embodiments, the user-interaction-evaluation system 102 generates content scores associated with quizzes or tests provided to the user account 302. For instance, in connection with a particular user-interaction evaluation, the user-interaction-evaluation system 102 can provide one or more questions to the user account 302. The user-interaction-evaluation system 102 can then generate a content score based on the user's response(s) to the question (s). In some instances, the user-interaction-evaluation system 102 can process a response as a string, integer float/double, date, Boolean, or array depending on the type of question and the type of response. The user-interaction-evaluation system 102 can then compare the response to a stored response in the persistent storage and generate the content score based on the comparison. The user-interaction-evaluation system 102 can also store the questions, responses, content scores, and timestamps associated with the user-interaction evaluation(s) in the persistent storage.

As illustrated in FIG. 3A, after determining the interaction scores 312 and the content scores 313, the user-interaction-evaluation system 102 generates the digital-media-proficiency metric 300. Specifically, the user-interaction-evaluation system 102 can combine the interaction scores 312 and content scores 313 to determine the digital-media-proficiency metric 300 as a combined measurement of an overall digital media literacy for the user account 302. In some embodiments, the user-interaction-evaluation system 102 determines the digital-media-proficiency metric 300 as an addition of all the interaction scores 312 and the content scores 313. Accordingly, the user-interaction-evaluation system 102 can normalize each interaction score and content score or weight the scores based on interaction or content type.

In one or more embodiments, the user-interaction-evaluation system 102 also determines evaluation proficiency metrics 314a-314n associated with user-interaction evaluations. For example, the user-interaction-evaluation system 102 can generate an evaluation proficiency metric for each user-interaction evaluation initiated in connection with the user account 302. Each user-interaction evaluation can be associated with one or more user interaction scores or one or more content scores. Accordingly, the user-interaction-evaluation system 102 can generate each evaluation proficiency metric based on the corresponding interaction scores and/or content scores. Additionally, the sum of all evaluation proficiency metrics 314a-314n can be equal to the digital-media-proficiency metric 300.

As previously mentioned, FIG. 3B illustrates additional detail associated with generating an interaction score for a user interaction. In particular, FIG. 3B illustrates that the user-interaction-evaluation system 102 generates an interaction score 316 for a user interaction 318 relative to digital content 320. More specifically, the user-interaction-evaluation system 102 generates the interaction score 316 by combining a content score 322 for the digital content 320 and an interaction weight 324 based on the user interaction 318.

In one or more embodiments, the user-interaction-evaluation system 102 generates the content score 322 for the digital content 320 based on a content type of the digital content 320. For example, the user-interaction-evaluation system 102 can determine a value or quality of a message (e.g., a social networking post or private/direct message) generated by a user account or a bot account based on the content of the message. The user-interaction-evaluation system 102 can generate the content score 322 by utilizing natural language processing to evaluate various aspects of the digital content including, but not limited to, meaning, tone, and whether the message is directed to another user. The user-interaction-evaluation system 102 can also generate the content score 322 by detecting specific words or phrases in the message. In some embodiments, the user-interaction-evaluation system 102 assigns certain types of content a predetermined score mapped to the type of content.

In one or more embodiments, the user-interaction-evaluation system 102 evaluates whether the digital content 320 is good, bad, or neutral based on the resulting value of the content score 322 relative to a threshold value. To illustrate, a content score above the threshold value indicates good content, a content score below the threshold value indicates bad content, and a content score equal to (or within a specific distance of) the threshold value indicates neutral content. In some instances, the user-interaction-evaluation system 102 utilizes more than one threshold value to indicate varying degrees of value of the digital content 320. In one or more embodiments, the user-interaction-evaluation system 102 generates content scores on a scale that includes positive and negative values (e.g., with zero as the threshold value)—a positive value indicating good content, a negative value indicating bad content, and a zero value indicating neutral content. For example, the user-interaction-evaluation system 102 can generate content scores on a numeric scale (e.g., from −10 to +10), alphabetic scales, alphanumeric scales, Boolean scales or other grading scales, in which negative values indicate bad content, a zero value indicates neutral content, and positive values indicate good content.

In one or more embodiments, user interactions can also affect a content score. For example, the user-interaction-evaluation system 102 can learn from user interactions based on actions to report or block digital content to modify a content score of the digital content. Accordingly, if a plurality of users report a digital content item (e.g., a social networking post), the user-interaction-evaluation system 102 can mark the digital content item as reported by the number of users that reported the digital content item. Additionally, the user-interaction-evaluation system 102 can penalize a content score for the digital content item based on the number of users that reported the digital content item.

As further shown in FIG. 3B, the user-interaction-evaluation system 102 can determine the interaction weight 324 associated with the user interaction 318 based on an interaction type of the user interaction 318. For instance, the user-interaction-evaluation system 102 can determine a value or quality of an action by a user account to interact with the digital content 320 within a social networking platform. To illustrate, the user-interaction-evaluation system 102 can determine a weight (e.g., an integer or float/double value) associated with each possible interaction type relative to the digital content 320. In particular, the interaction weight 324 indicates a degree or type of involvement associated with the user interaction 318 relative to other possible user interactions.

For example, replying to a social networking post can indicate a greater degree of involvement than merely liking or favoriting the social networking post. Accordingly, the user-interaction-evaluation system 102 can determine a higher weight if the user interaction 318 includes a response to the social networking post or a lower weight if the user interaction 318 includes a like or favorite of the social networking post. Additionally, the user-interaction-evaluation system 102 can assign positive weights to certain user interactions while assigning negative weights to other user interactions. To illustrate, the user-interaction-evaluation system 102 can assign a positive weight to a user interaction including a response action and a negative weight to a user interaction including a report/block action.

Additionally, the user-interaction-evaluation system 102 can determine the interaction weight 324 based on whether a particular user interaction increases or decreases a security risk of disclosing sensitive information associated with a user account. For instance, the user-interaction-evaluation system 102 can determine whether a user shares secure information with another user account or bot account within the social networking system. The user-interaction-evaluation system 102 can also detect when a user clicks on or reports a link from a bot account (e.g., a spam or malware link generated by a digital media bot). The user-interaction-evaluation system 102 can thus determine the interaction weight 324 according to the severity and likelihood of a security breach to the user account.

As FIG. 3B illustrates, after determining the content score 322 and the interaction weight 324, the user-interaction-evaluation system 102 generates the interaction score 316. Specifically, the user-interaction-evaluation system 102 can combine the content score 322 and the interaction weight 324 to generate the interaction score 316 indicating a value of the user interaction 318 based on the digital content 320.

For example, the user-interaction-evaluation system 102 can determine a product of the content score 322 and the interaction weight 324. In another example, the user-interaction-evaluation system 102 can determine a sum of the content score 322 and the interaction weight 324. Thus, the user-interaction-evaluation system 102 determines whether the interaction score 316 indicates a positive interaction or a negative interaction based on whether the product of the content score 322 and the interaction weight 324 is positive or negative, respectively.

To illustrate, the user-interaction-evaluation system 102 can determine that the user interaction 318 is a positive interaction if the content score 322 and interaction weight 324 have positive values (e.g., a high degree of involvement with good content). Additionally, the user-interaction-evaluation system 102 can determine that the user interaction 318 is a positive interaction if the content score 322 and the interaction weight 324 have negative values (e.g., a low degree of involvement with bad content). Furthermore, the user-interaction-evaluation system 102 can determine that the user interaction 318 is a negative interaction if the content score 322 is negative and the interaction weight 324 is positive, or vice versa. For instance, if the user interaction 318 includes a response to a social networking post generated by a digital media bot, the user-interaction-evaluation system 102 can determine that the interaction score 316 indicates a negative interaction. Similarly, if the user interaction 318 includes a block/report of a digital content item associated with a user account including good content, the user-interaction-evaluation system 102 can determine that the interaction score 316 indicates a negative interaction.

In some additional embodiments, the user-interaction-evaluation system 102 also evaluates user interactions between user accounts and other user accounts (or bot accounts) within a social networking platform. For example, the user-interaction-evaluation system 102 can assign a predetermined account value to an account of a social networking platform. To illustrate, the user-interaction-evaluation system 102 can assign a user account a positive value (e.g., a 1). Additionally, the user-interaction-evaluation system 102 can assign a bot account a positive value, neutral value, or a negative value based on the type of digital media bot (e.g., a spam bot, ad bot, user-assistance bot). Accordingly, the user-interaction-evaluation system 102 can generate an interaction score by combining the corresponding interaction weight and the predetermined account value.

In one or more embodiments, the user-interaction-evaluation system 102 determines a digital media proficiency of users by determining interactions scores of user interactions relative to harmful content on a social networking platform. For example, the user-interaction-evaluation system 102 can analyze how well a user interacts in response to witnessing cyber bullying within the social networking platform. To illustrate, in one or more embodiments, the user-interaction-evaluation system 102 executes a plurality of digital media bots as part of a user-interaction evaluation related to cyber bullying to generate digital messages between the plurality of digital media bots.

In particular, the digital messages can include one or more digital media bots generating digital messages responding with disparaging comments to a digital message of another digital media bot within the social networking platform in which the digital messages are visible to other users. The digital media bots can continue interacting until the actions of each digital media bot have executed or until a user account reports or blocks the bot accounts of the digital media bots. The user-interaction-evaluation system 102 can then analyze any user interactions by the user account including whether the user account responded to (or liked/favorited) the digital messages and/or blocked the bot accounts.

Figure 4A:
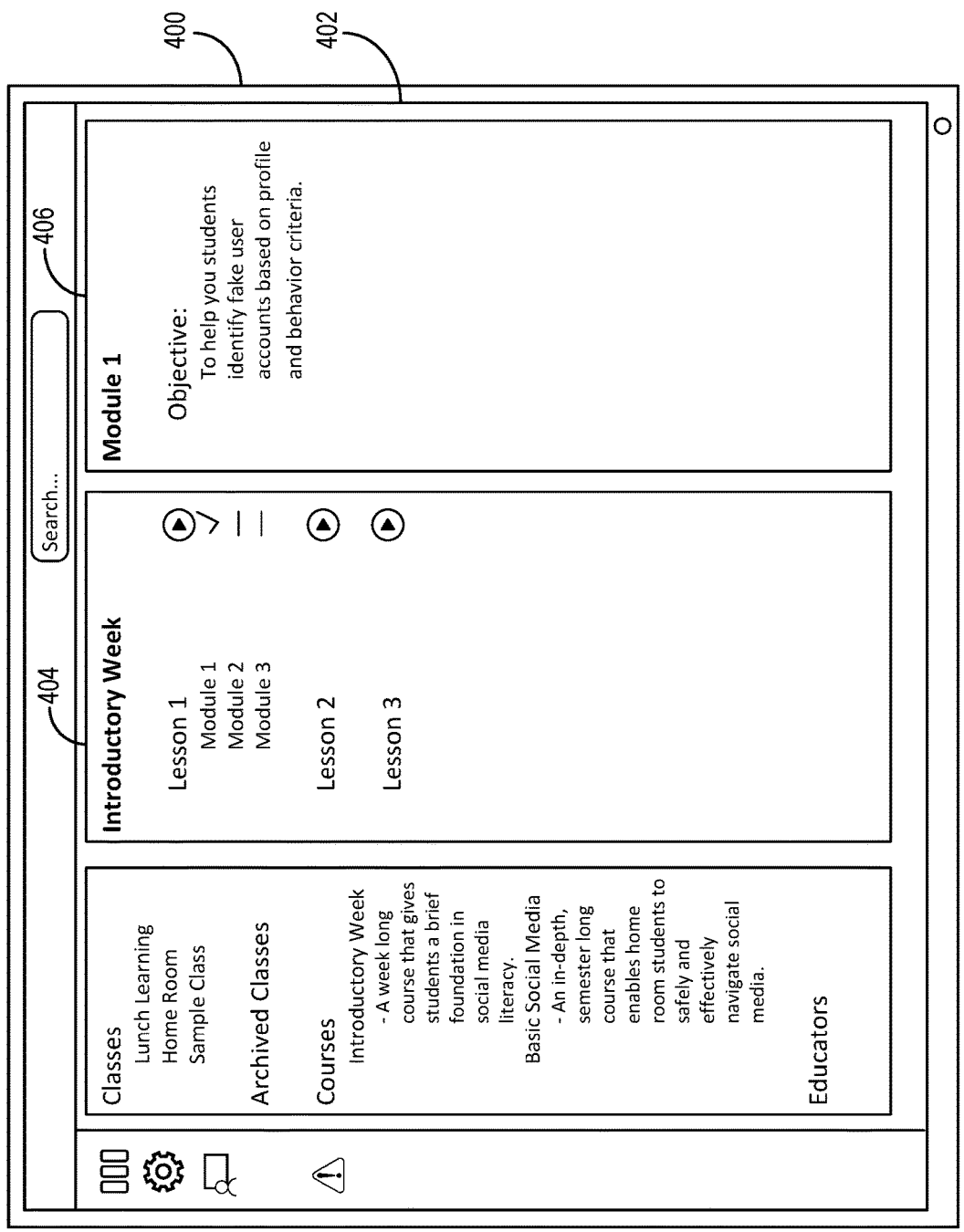
FIGS. 4A-4E illustrate example graphical user interfaces for implementing user-interaction evaluations in a social networking platform in accordance with one or more implementations.
Figure 4B:
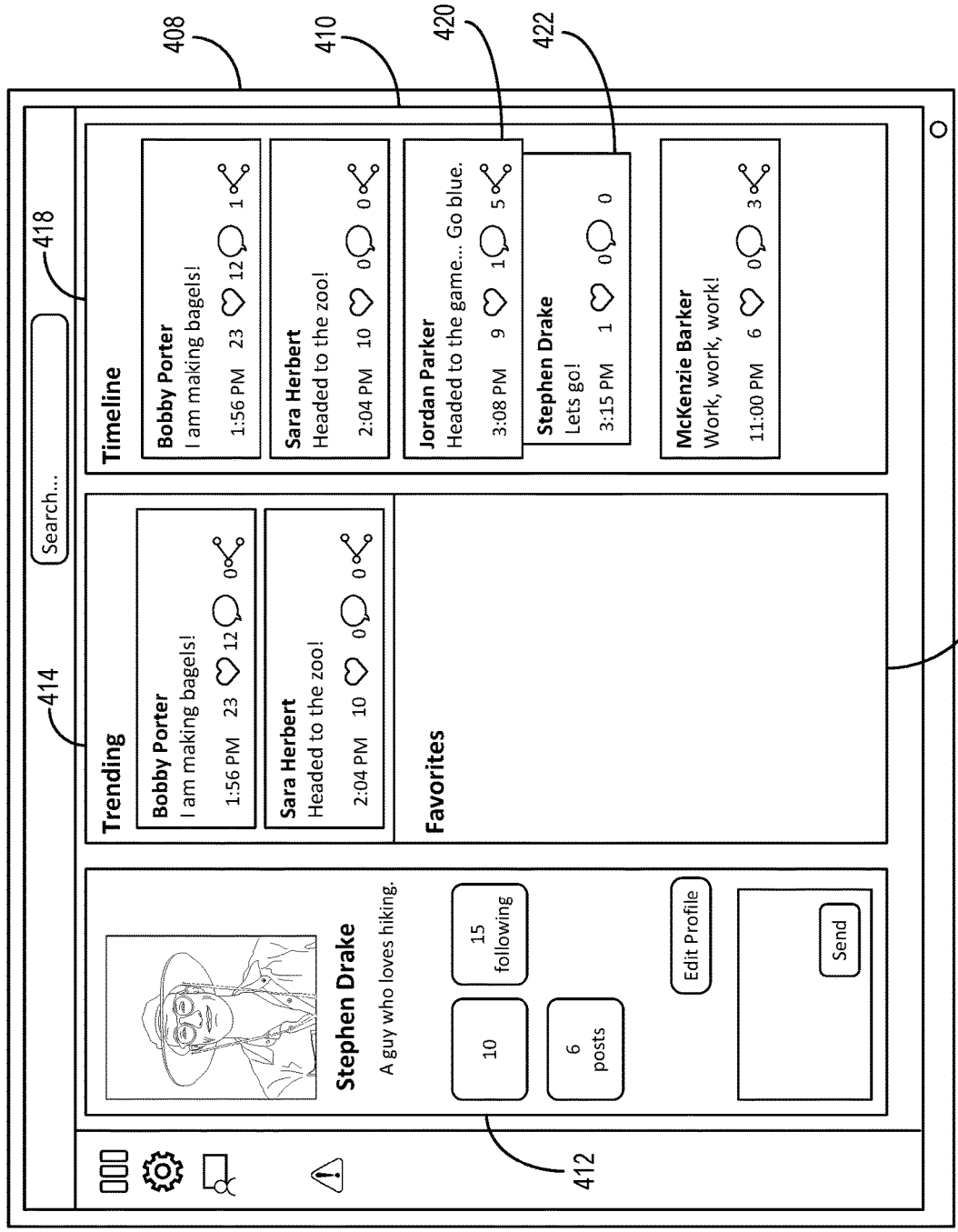
Figure 4C:
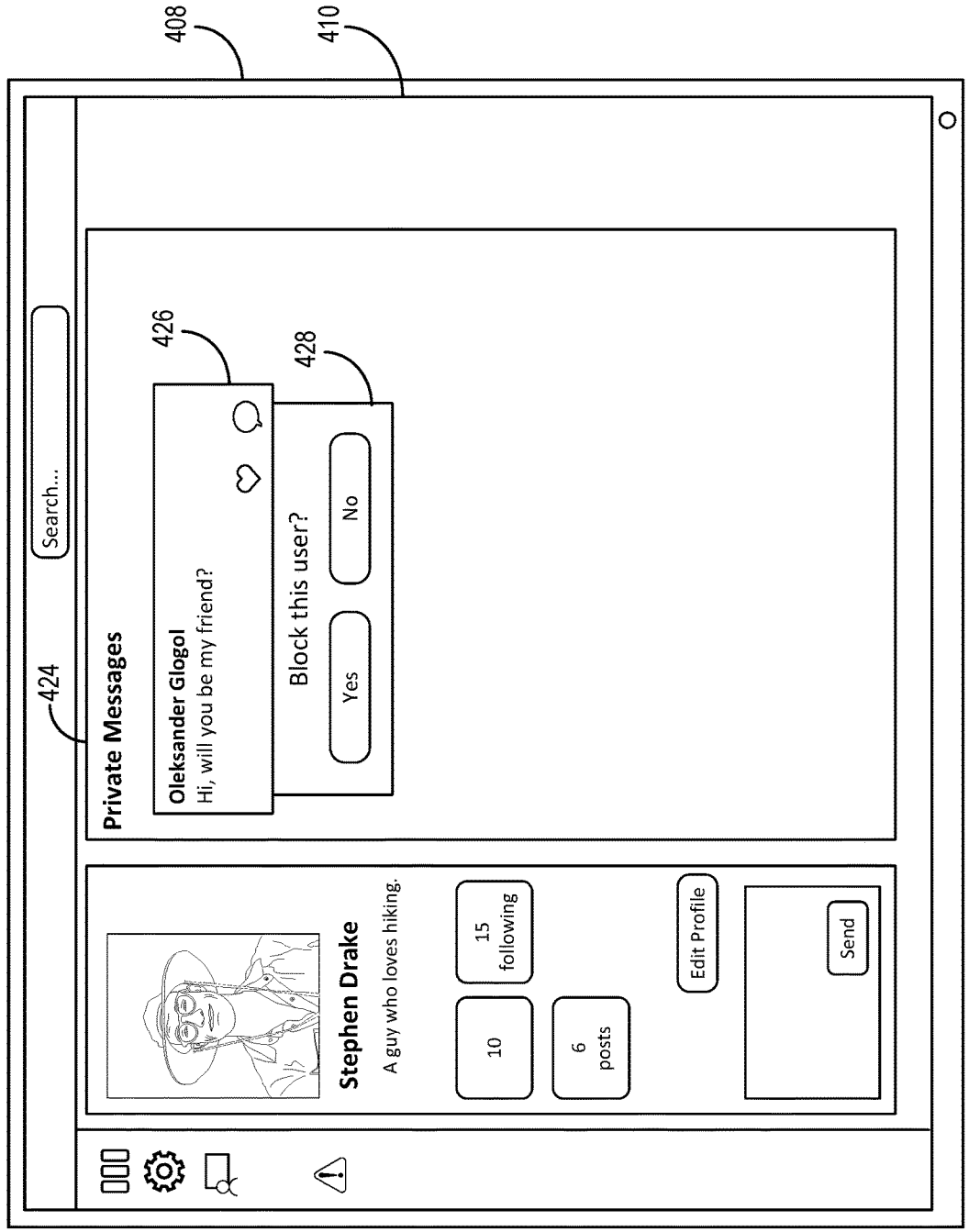
Figure 4D:
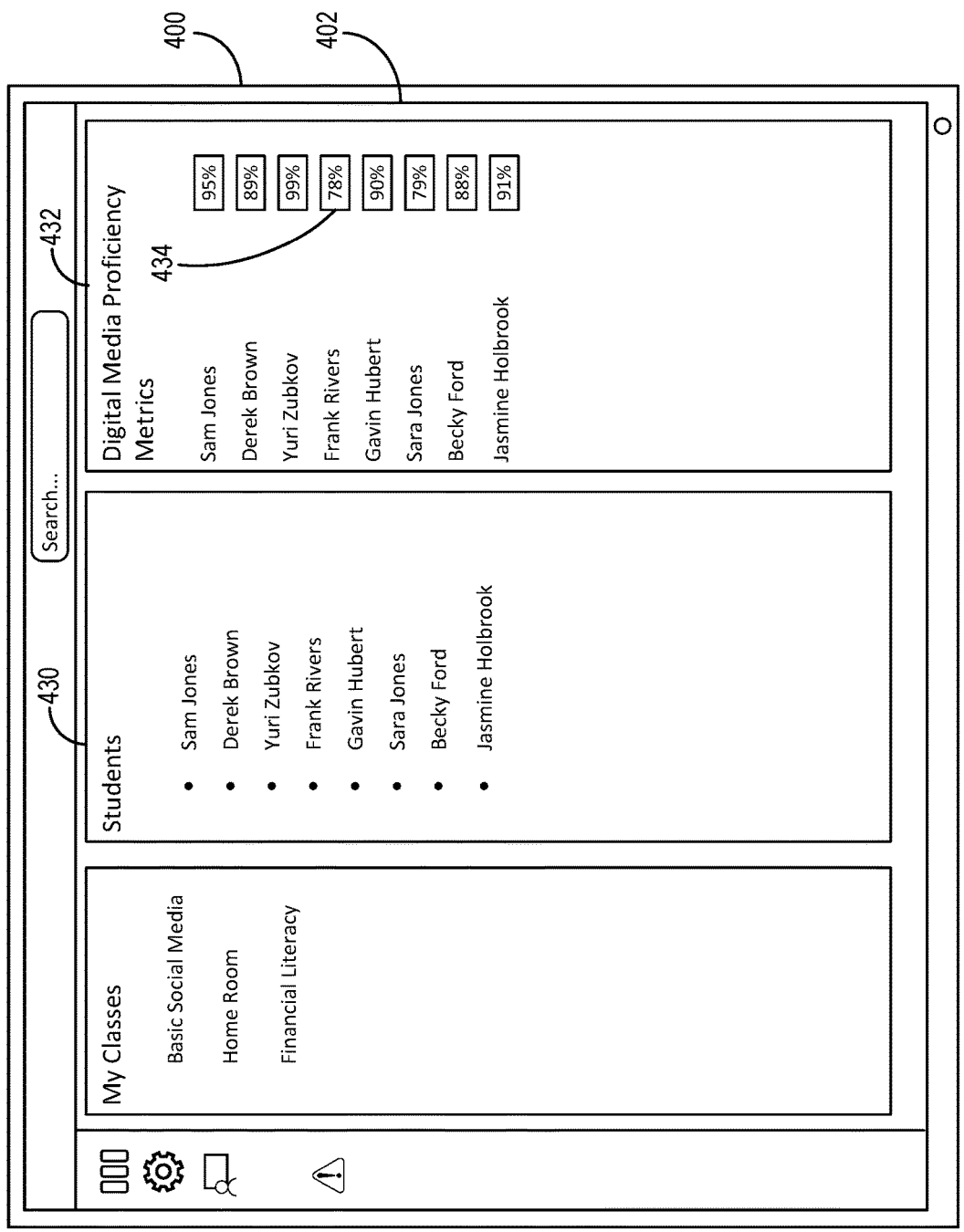
Figure 4E:
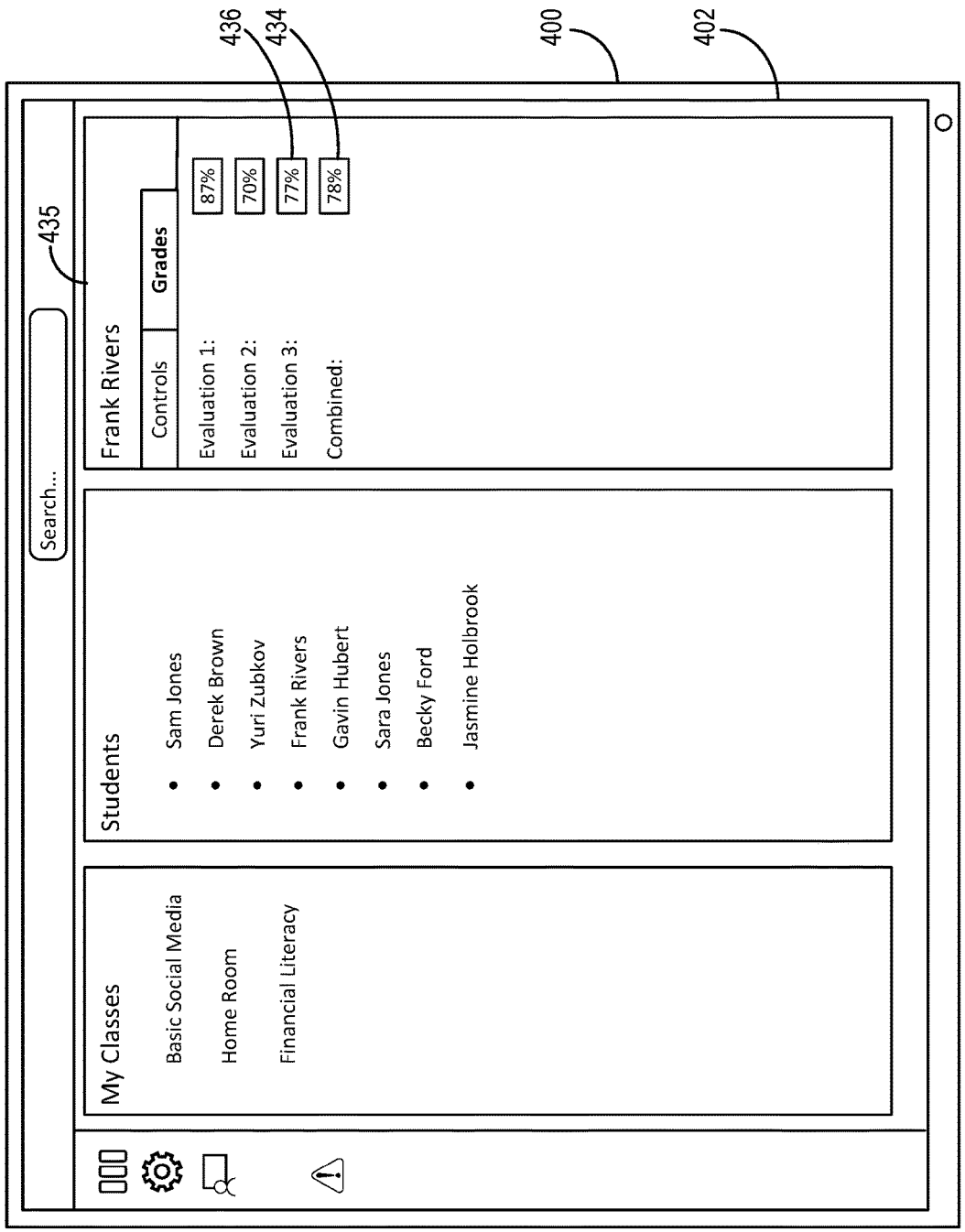

FIGS. 4A-4E illustrate graphical user interfaces for client devices associated with a social networking platform of the user-interaction-evaluation system 102. Specifically, FIGS. 4A and 4D-4E illustrate graphical user interfaces on an administrator client device for initiating user-interaction evaluations and determining digital media literacy of users of the social networking platform. Additionally, FIGS. 4B and 4C illustrate graphical user interfaces on a user client device for performing actions to generate digital content and/or interact with digital content or other user accounts within the social networking platform.

For example, FIG. 4A illustrates an administrator client device 400 including an administrator graphical user interface 402 for an administrator client application of the user-interaction-evaluation system 102. For example, the user-interaction-evaluation system 102 provides, via the administrator graphical user interface 402, data associated with managing and initiating one or more user-interaction evaluations as part of a structured educational system. To illustrate, the user-interaction-evaluation system 102 provides a user-interaction evaluation interface 404 including a plurality of user-interaction evaluations associated with evaluating digital media literacy. In particular, the user-interaction-evaluation system 102 can organize the user-interaction evaluations according to similar topics, instruction order, or other organizational structure. The administrator client device 400 can receive one or more inputs selecting one or more user-interaction evaluations via the user-interaction evaluation interface 404 for previewing or initiating the user-interaction evaluation(s).

In one or more embodiments, the user-interaction-evaluation system 102 also provides, via the administrator graphical user interface 402, a preview interface 406 to display a preview of a selected user-interaction evaluation. Specifically, FIG. 4A illustrates that the administrator client device 400 displays a preview of a selected user-interaction evaluation within the preview interface 406 in response to a selection by the administrator of the user-interaction evaluation within the user-interaction evaluation interface 404. Additionally, the preview can include information about the user-interaction evaluation such as, but not limited to, an objective of the user-interaction evaluation, a lesson plan associated with the user-interaction evaluation, or a preview of selectable elements that become available upon initiating the user-interaction evaluation.

According to one or more embodiments, after the user-interaction-evaluation system 102 has received a request to initiate one or more of the user-interaction evaluations, the user-interaction-evaluation system 102 can initiate the user-interaction evaluation(s). For instance, the user-interaction-evaluation system 102 can initiate the user-interaction evaluation by performing one or more actions associated with the user-interaction evaluation including executing a digital media bot corresponding to the user-interaction evaluation. Executing a digital media bot as part of a user-interaction evaluation can include the user-interaction-evaluation system 102 utilizing the digital media bot to generate digital content within the social networking system.

In connection with initiating a user-interaction evaluation, the user-interaction-evaluation system 102 can enable access to a social networking platform by a plurality of users. For example, FIG. 4B illustrates an embodiment of a user client device 408 displaying a user graphical user interface 410 for a user client application associated with the social networking platform. The user-interaction-evaluation system 102 can provide users with tools for generating digital content or interacting with digital content or users within the social networking platform.

FIG. 4B illustrates that the user client device 408 displays a user profile 412 including profile details associated with a user account associated with a user. Specifically, the user-interaction-evaluation system 102 receives information from the user client device 408 to include in the user profile 412. For instance, the user client device 408 can provide a profile image and/or a profile bio including information about the user. The user profile 412 can also include additional detail associated with the user account based on user account activity and user account settings.

Additionally, FIG. 4B illustrates that the user client device 408 displays, within the user graphical user interface 410, a plurality of interfaces corresponding to digital content generated by the user account, by other user accounts, or by bot accounts. For example, FIG. 4B illustrates a trending interface 414 that includes social networking posts that meet an interaction threshold (e.g., a number of responses, likes, or shares). FIG. 4B also illustrates a favorites interface 416 that displays digital content that the user account has marked or selected as a favorite (e.g., for quick access at a later date or for displaying to other user accounts in connection with the user profile 412). FIG. 4B further illustrates a timeline interface 418 including recent social networking posts generated by user accounts of the social networking platform.

In particular, as illustrated in FIG. 4B, the timeline interface 418 includes social networking posts (e.g., a first social networking post 420) or other digital content (e.g., images/video) generated by one or more user accounts associated with the user account corresponding to the user client device 408. To illustrate, the user account can include or be associated with a friend list that includes one or more user accounts of the social networking platform. In some embodiments, the user-interaction-evaluation system 102 provides digital content generated by user accounts to the user client device 408 for display within the timeline interface 418 as the digital content is generated.

Additionally, the user-interaction-evaluation system 102 can receive indications of interactions with digital content generated by user accounts. For instance, the user-interaction-evaluation system 102 can detect interactions by the user of the user client device 408 to view, select, respond to, like, report, block, or otherwise interact with social networking posts within the timeline interface 418. The user-interaction-evaluation system 102 can cause the user client device 408 and other user client devices associated with the social networking platform to display indications of the interactions.

As further indicated by FIG. 4B, the user-interaction-evaluation system 102 can provide for display at the user client device 408 the interactions within the timeline interface 418 with the corresponding digital content. To illustrate, in response to receiving a response 422 to the first social networking post 420 by the user account, the user-interaction-evaluation system 102 can display the response 422 with the first social networking post 420 within the timeline interface 418.

Additionally, the user-interaction-evaluation system 102 can detect interactions by the user of the user client device 408 to view, follow, report, block, or otherwise interact with other accounts of the social networking platform. The user-interaction-evaluation system 102 can store such interactions in connection with the user account (e.g., in a database of user interactions and/or in the user account itself). The user-interaction-evaluation system 102 can provide indications of such interactions to the user client device 408 upon request (e.g., with a user account history). In one or more embodiments, the user-interaction-evaluation system 102 keeps such interactions private for only the user account and an administrator account to access.

FIG. 4C illustrates that the user client device 408 displays additional information or interfaces within the user graphical user interface 410 of the user client application. In particular, the user client device 408 can display a private message interface 424 for displaying private messages exchanged between the user account and other user accounts within the social networking platform. Additionally, in one or more embodiments, the user-interaction-evaluation system 102 executes a digital media bot to generate a private message 426 from a bot account to the user account as part of a user-interaction evaluation. Accordingly, FIG. 4C illustrates that the private message interface 424 includes the private message 426 from the bot account to the user account.

After the user client device 408 receives the private message 426 and displays the private message 426 in the private message interface 424, the user-interaction-evaluation system 102 can provide tools for interacting with the private message 426. For example, the user client device 408 can display tools for the user to respond to, like, favorite, delete, or otherwise interact with the private message 426 via the user account. In one or more embodiments, the user-interaction-evaluation system 102 also provides tools for reporting or blocking accounts of the social networking platform. Thus, in response to detecting a request to block the bot account associated with the private message 426, the user-interaction-evaluation system 102 can also provide a confirmation message 428 requesting the user to confirm the request to block the bot account.

As discussed previously, the user-interaction-evaluation system 102 can utilize user interactions to generate digital-media-proficiency metrics for users of the user-interaction-evaluation system 102. FIG. 4D illustrates that the administrator client device 400 displays information associated with digital-media-proficiency metrics for the users within the administrator graphical user interface 402. Specifically, the user-interaction-evaluation system 102 can provide a user listing 430 including users of the user-interaction-evaluation system 102. For instance, the user listing 430 can include students in a particular class, employees of a business, or otherwise display a group of users for which the user-interaction-evaluation system 102 determines a digital media proficiency of the users via a social networking platform.

FIG. 4D further illustrates that the administrator client device 400 displays a metric interface 432 including a plurality of digital-media-proficiency metrics for the users. To illustrate, the metric interface 432 includes a first digital-media-proficiency metric 434 for a user based on the user's interactions detected within the social networking platform. In one or more embodiments, the user-interaction-evaluation system 102 generates the digital-media-proficiency metrics to include a percentage-based grade. In alternative embodiments, the user-interaction-evaluation system 102 generates the digital-media-proficiency metrics to include a visual indicator that indicates the calculated digital-media-proficiency metric for a user relative to a maximum or minimum value. To illustrate, the user-interaction-evaluation system 102 can provide bar indicators that include lengths or colors indicative of the digital-media-proficiency metrics.

In one or more embodiments, the user-interaction-evaluation system 102 can also provide additional detail for specific digital-media-proficiency metrics. FIG. 4E illustrates that the administrator client device 400 displays specific detail about the digital-media-proficiency metric for a particular user within a detailed metric interface 435. In particular, in response to a request to display details for the digital-media-proficiency metric 434 for the user of FIG. 4D, the user-interaction-evaluation system 102 provides the details to the administrator client device 400 to display within the detailed metric interface 435.

As FIG. 4E illustrates, the administrator client device 400 displays the digital-media-proficiency metric 434 for the selected user within the detailed metric interface 435. Additionally, the administrator client device 400 displays a plurality of individual evaluation proficiency metrics corresponding to a digital media proficiency of the user with respect to each of a plurality of user-interaction evaluations. For example, FIG. 4E illustrates an evaluation proficiency metric 436 for a specific user-interaction evaluation in which the user participated. As shown, the user-interaction-evaluation system 102 generates the digital-media-proficiency metric 434 based on a combination of the plurality of evaluation proficiency metrics (e.g., by averaging the evaluation proficiency metrics). In one or more embodiments, the user-interaction-evaluation system 102 weights each evaluation proficiency metric according to weights of the corresponding user-interaction evaluations.

In one or more embodiments, as illustrated, the user-interaction-evaluation system 102 generates and provides the evaluation proficiency metrics and the digital-media-proficiency metric 434 for display as percentages out of a total possible value. In other embodiments, the user-interaction-evaluation system 102 provides the metrics for display as a color scale. Specifically, the user-interaction-evaluation system 102 can generate indicators with a color and size/length indicating the value of the metric out of a maximum possible value. To illustrate, a small/short bar with a red color value can indicate a low evaluation proficiency metric or digital-media-proficiency metric, while a large/long bar with a green color value can indicate a high evaluation proficiency metric or digital-media-proficiency metric. Additionally, in some embodiments, the user-interaction-evaluation system 102 displays the digital-media-proficiency metric as a visual combination of the individual evaluation proficiency metrics (e.g., as a plurality of colored bars shaped into a single bar).

In one or more embodiments, the user-interaction-evaluation system 102 also provides interaction scores and content scores to the administrator client device 400. For example, the administrator client device 400 can display interaction scores for user interactions and content scores for digital content generated by user accounts or bot accounts. In one or more embodiments, the user-interaction-evaluation system 102 can provide an option for an administrator to override an interaction score or a content score. To illustrate, if the administrator determines that a determined score is wrong (e.g., based on group actions that bias content scores or interaction scores, such as by mass reporting of content), the administrator can override the score(s). In response to receiving a request to override a score, the user-interaction-evaluation system 102 can change the corresponding score to a new score (e.g., by removing a penalty applied to the score) and update evaluation proficiency metrics and/or digital-media-proficiency metrics based on the updated scores.

Figure 5:
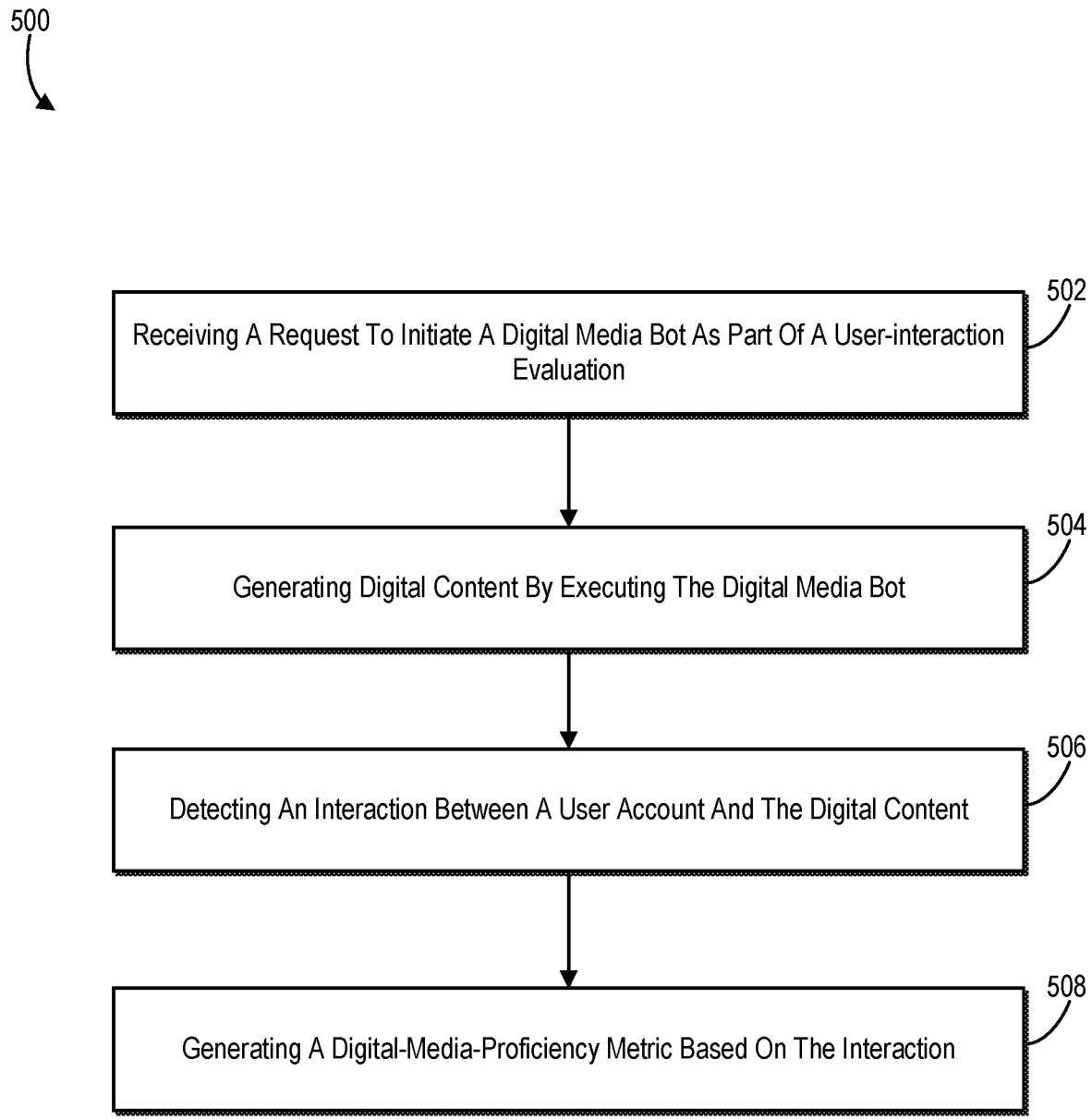
FIG. 5 illustrates a flowchart of a series of acts for determining digital media literacy of users of a social networking platform in accordance with one or more implementations.

Turning now to FIG. 5, this figure shows a flowchart of a series of acts 500 of utilizing digital media bots as part of a user-interaction evaluation for digital media proficiency of users within a social networking platform. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable medium can comprise instructions, that when executed by one or more processors, cause a computing device to perform the acts of FIG. 5. In still further embodiments, a system can perform the acts of FIG. 5.

As shown, the series of acts 500 includes an act 502 of receiving a request to initiate a digital media bot as part of a user-interaction evaluation. For example, act 502 involves receiving a request to initiate a digital media bot as part of a user-interaction evaluation for digital media proficiency in a social networking platform comprising a plurality of users. Act 502 can involve receiving a selection of a user-interaction evaluation from a plurality of user-interaction evaluations corresponding to a plurality of topics.

The series of acts 500 also includes an act 504 of generating digital content by executing the digital media bot. For example, act 504 involves, based on receiving the request, generating digital content by executing the digital media bot to perform one or more digital media actions associated with the user-interaction evaluation within the social networking platform. Act 504 can involve generating, from the digital media bot, a social networking post comprising digital text or digital images. Act 504 can then involve publishing the social networking post for display within the social networking platform to one or more users of the plurality of users. For example, act 504 can involve sending the social networking message from a social networking account associated with the digital media bot to the user account.

Additionally, the series of acts 500 includes an act 506 of detecting an interaction between a user account and the digital content. For example, act 506 involves detecting, within the social networking platform, an interaction between a user account associated with a user of the plurality of users and the digital content generated by executing the digital media bot.

Act 506 can involve generating a bot interaction by executing an additional digital media bot to perform an action relative to the digital content from the digital media bot as part of the user-interaction evaluation. Act 506 can also involve detecting the interaction between the user account and the digital content generated by executing the digital media bot by detecting that the user interacts with the digital content in response to the bot interaction.

The series of acts 500 further includes an act 508 of generating a digital media proficiency metric based on the interaction. For example, act 508 involves generating a digital-media-proficiency metric for the user based on the interaction between the user account and the digital content generated by executing the digital media bot.

Act 508 can involve generating a content score associated with the digital content. For example, act 508 can involve generating the content score based on a content type of the digital content. Additionally, act 508 can involve determining an interaction weight associated with the interaction between the user account and the digital content. For instance, act 508 can involve determining the interaction weight according to a mapping of predetermined weights to interactions for the digital content. Act 508 can further involve generating an interaction score for the interaction based on the content score and the interaction weight. For example, act 508 can involve generating the interaction score for the interaction by determining a product of the content score and the interaction weight. Act 508 can then involve generating the digital-media-proficiency metric for the user based on the interaction score.

Act 508 can involve identifying a particular interaction weight for the interaction based on a degree to which the interaction increases a security risk of disclosing sensitive information associated with the user account. Act 508 can then involve identifying a different interaction weight for the interaction based on a degree to which the interaction decreases a security risk of disclosing sensitive information associated with the user account.

Act 508 can involve determining a plurality of interaction scores for interactions between the user account and digital content generated by a plurality of digital media bots. Act 508 can then involve generating the digital-media-proficiency metric by combining the plurality of interaction scores.

In one or more embodiments, act 508 involves determining a positive interaction weight in response to determining that the interaction comprises a positive interaction. Additionally, act 508 can involve determining a negative interaction weight in response to determining that the interaction comprises a negative interaction.

The series of acts 500 can also include detecting, within the social networking platform, one or more additional interactions between the user account and additional digital content generated by one or more other users of the plurality of users. Act 508 can further involve generating the digital-media-proficiency metric for the user further based on the one or more additional interactions between the user account and the additional digital content.

The series of acts 500 can include generating a profile score based on profile data provided in a profile by the user account of the user. For example, the profile data can include a profile picture and a profile description. Act 508 can involve generating the digital-media-proficiency metric for the user further based on the profile score.

Furthermore, the series of acts 500 can include generating a text score for text associated with the user account by: comparing portions of the text to a database of problematic character strings; and generating the text score based on identifying one or more problematic character strings in the text. The series of acts 500 can also include generating a password score for a password associated with the user account based on a password strength associated with the password. Additionally, act 508 can involve generating the digital-media-proficiency metric for the user further based on the text score and the password score.

Additionally, the series of acts 500 can include determining account security, privacy, and notification settings for a user account of one or more user accounts. Act 508 can involve, based on the account security, privacy, and notification settings of the user account, sending the digital content generated by executing the digital media bot to the user account within the social networking platform.

As part of act 508, or as an additional act, the series of acts 500 can include providing the interaction score for the interaction to an administrator device. The series of acts 500 can also include receiving a request by the administrator to generate an updated interaction score by overriding the interaction score for the interaction. The series of acts 500 can further include updating the digital-media-proficiency metric based on the updated interaction score.

In one or more embodiments, the series of acts 500 includes receiving a social networking post generated by the user account of the user for publishing to one or more users of the plurality of users via the social networking platform. The series of acts 500 can include generating a content score for the social networking post generated by the user account of the user based on digital content in the social networking post. Act 508 can then involve generating the digital-media-proficiency metric for the user further based on the content score.

In one or more embodiments, the series of acts 500 also includes determining that the digital-media-proficiency metric for the user does not meet a threshold metric value. For example, the series of acts 500 can include determining that the digital-media-proficiency metric includes or is based on a negative interaction or a neutral interaction associated with the user account. The series of acts 500 can also include, based on the digital-media-proficiency metric for the user not meeting the threshold metric value, generating additional digital content to send to the user account, or sending a notification to an administrator device with suggested digital content to send to the user account.

In one or more embodiments, the series of acts 500 includes generating, based on the digital-media-proficiency metric for the user, additional digital content associated with one or more user-interaction evaluations. The series of acts 500 can also include providing, to the user account, the additional digital content within a separate instance of the social networking platform. Additionally, the series of acts 500 can include detecting, within the separate instance of the social networking platform, one or more additional interactions between the user account and the additional digital content. The series of acts 500 can then include generating, in connection with the separate instance of the social networking platform, a separate digital-media-proficiency metric for the user based on the one or more additional interactions between the user account and the additional digital content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
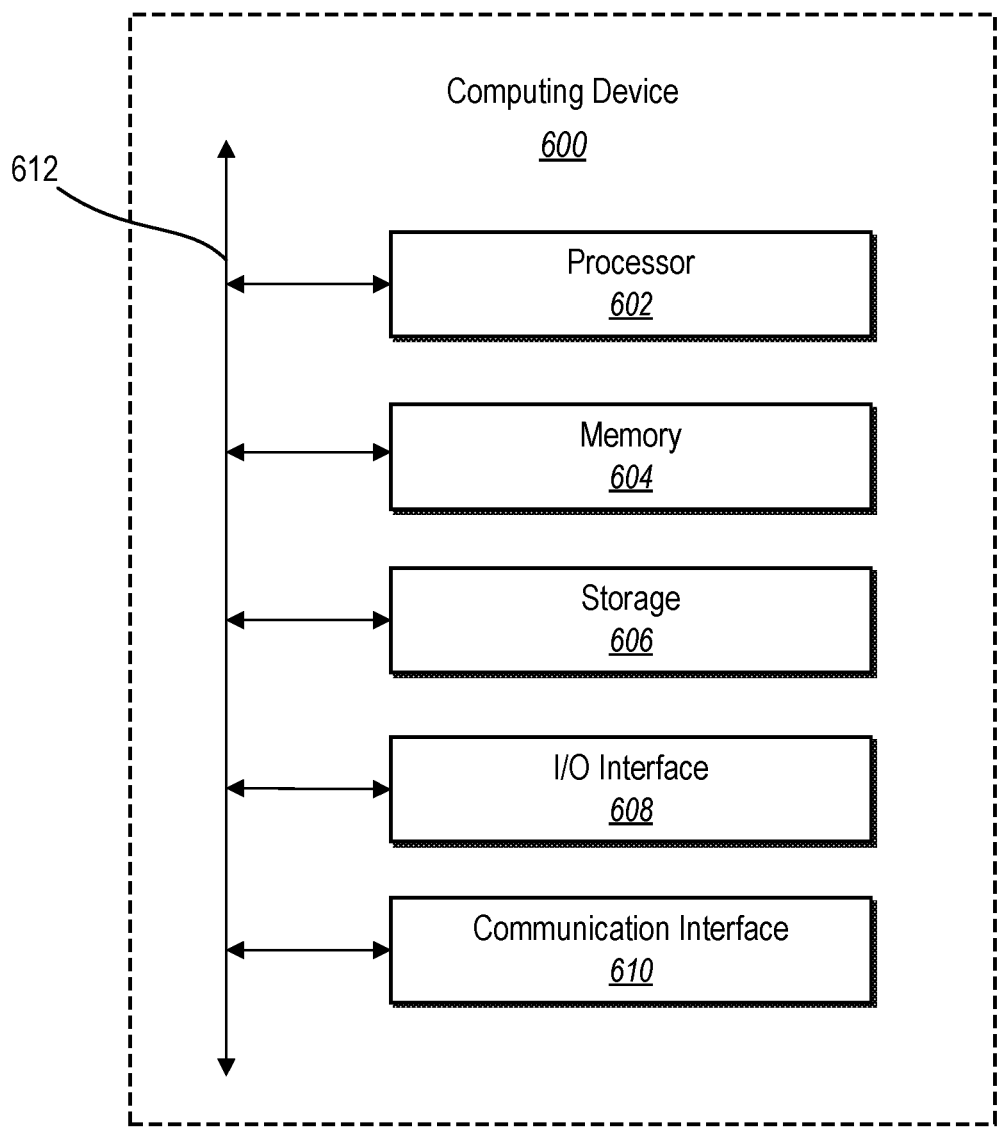
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system(s) of FIG. 1. As shown by FIG. 6, the computing device 600 can comprise a processor 602, a memory 604, a storage device 606, an I/O interface 608, and a communication interface 160, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for dynamically modifying workflows, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions for performing the methods described herein.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 160 can include hardware, software, or both. In any event, the communication interface 160 can provide one or more interfaces for communication (such as, for example, packet-based communication) between the computing device 600 and one or more other computing devices or networks. As an example, and not by way of limitation, the communication interface 160 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 160 may facilitate communications with various types of wired or wireless networks. The communication interface 160 may also facilitate communications using various communication protocols. The communication infrastructure 612 may also include hardware, software, or both that couples components of the computing device 600 to each other. For example, the communication interface 160 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   receive a request to initiate a digital media bot as part of a user-interaction evaluation for digital media proficiency in a social networking platform comprising a plurality of users;
   based on receiving the request, generate digital content by executing the digital media bot to perform one or more digital media actions associated with the user-interaction evaluation within the social networking platform;
   detect, within the social networking platform, an interaction between a user account associated with a user of the plurality of users and the digital content generated by executing the digital media bot; and
   generate a digital-media-proficiency metric for the user based on the interaction between the user account and the digital content generated by executing the digital media bot.

2. The non-transitory computer readable storage medium as recited in claim 1, further comprising instructions that, when executed by the at least one processor, cause the computing device to generate the digital content by executing the digital media bot by:
   generating, from the digital media bot, a social networking post comprising the digital content; and
   publishing the social networking post for display within the social networking platform to one or more users of the plurality of users.

3. The non-transitory computer readable storage medium as recited in claim 1, further comprising instructions that, when executed by the at least one processor, cause the computing device to generate the digital-media-proficiency metric for the user by:
   generating a content score associated with the digital content;
   determining an interaction weight associated with the interaction between the user account and the digital content;
   generating an interaction score for the interaction based on the content score and the interaction weight; and
   generating the digital-media-proficiency metric for the user based on the interaction score.

4. The non-transitory computer readable storage medium as recited in claim 3, further comprising instructions that, when executed by the at least one processor, cause the computing device to:
   provide the interaction score for the interaction to an administrator device;
   receive a request by the administrator device to generate an updated interaction score by overriding the interaction score for the interaction; and
   update the digital-media-proficiency metric based on the updated interaction score.

5. The non-transitory computer readable storage medium as recited in claim 3, further comprising instructions that, when executed by the at least one processor, cause the computing device to determine the interaction weight associated with the interaction by:
   determining a positive interaction weight in response to determining that the interaction comprises a positive interaction;
   determining a negative interaction weight in response to determining that the interaction comprises a negative interaction; or
   determining a neutral interaction weight in response to determining that the interaction comprises a neutral interaction.

6. The non-transitory computer readable storage medium as recited in claim 1, further comprising instructions that, when executed by the at least one processor, cause the computing device to:
   determine that the digital-media-proficiency metric for the user does not meet a threshold metric value; and based on the digital-media-proficiency metric for the user not meeting the threshold metric value:
  generate additional digital content to send to the user account; or
  send a notification to an administrator device with suggested digital content to send to the user account.

7. The non-transitory computer readable storage medium as recited in claim 1, further comprising instructions that, when executed by the at least one processor, cause the computing device to:
  detect, within the social networking platform, one or more additional interactions between the user account and additional digital content generated by one or more other users of the plurality of users; and
  generate the digital-media-proficiency metric for the user further based on the one or more additional interactions between the user account and the additional digital content.

8. The non-transitory computer readable storage medium as recited in claim 1, further comprising instructions that, when executed by the at least one processor, cause the computing device to:
  generate a profile score based on profile data provided in a profile by the user account of the user; and
  generate the digital-media-proficiency metric for the user further based on the profile score.

9. The non-transitory computer readable storage medium as recited in claim 1, further comprising instructions that, when executed by the at least one processor, cause the computing device to:
  determine account security, privacy, and notification settings for a particular user account of one or more user accounts of the social networking platform; and
  based on the account security, privacy, and notification settings of the particular user account, send the digital content generated by executing the digital media bot to the particular user account within the social networking platform.

10. The non-transitory computer readable storage medium as recited in claim 1, further comprising instructions that, when executed by the at least one processor, cause the computing device to:
  generate a bot interaction by executing an additional digital media bot to perform an action relative to the digital content from the digital media bot as part of the user-interaction evaluation; and
  detect the interaction between the user account and the digital content generated by executing the digital media bot by detecting that the user interacts with the digital content in response to the bot interaction.

11. A system comprising:
  at least one processor; and
  a non-transitory computer readable storage medium comprising instructions that, when executed by the at least one processor, cause the system to:
  receive a request to initiate a digital media bot as part of a user-interaction evaluation for digital media proficiency in a social networking platform comprising a plurality of users;
  based on receiving the request, generate digital content by executing the digital media bot to perform one or more digital media actions associated with the user-interaction evaluation within the social networking platform;
  detect, within the social networking platform, an interaction between a user account associated with a user of the plurality of users and the digital content generated by executing the digital media bot; and
  generate a digital-media-proficiency metric for the user based on the interaction between the user account and the digital content generated by executing the digital media bot.

12. The system as recited in claim 11, further comprising instructions that, when executed by the at least one processor, cause the system to generate the digital content by executing the digital media bot by:
  generating, from the digital media bot, a social networking message comprising digital text or digital images; and
  sending the social networking message from a social networking account associated with the digital media bot to the user account.

13. The system as recited in claim 11, further comprising instructions that, when executed by the at least one processor, cause the system to generate the digital-media-proficiency metric for the user by:
  generating a content score associated with the digital content based on a content type of the digital content;
  determining an interaction weight associated with the interaction between the user account and the digital content according to a mapping of predetermined weights to interactions for the digital content;
  generating an interaction score for the interaction by determining a product of the content score and the interaction weight; and
  generating the digital-media-proficiency metric for the user based on the interaction score.

14. The system as recited in claim 13, further comprising instructions that, when executed by the at least one processor, cause the system to generate the digital-media-proficiency metric for the user by:
  determining a plurality of interaction scores for interactions between the user account and digital content generated by a plurality of digital media bots; and
  generating the digital-media-proficiency metric by combining the plurality of interaction scores.

15. The system as recited in claim 13, further comprising instructions that, when executed by the at least one processor, cause the system to determine the interaction weight associated with the interaction according to the mapping of predetermined weights by:
  identifying a particular interaction weight for the interaction based on a degree to which the interaction increases a security risk of disclosing sensitive information associated with the user account; or
  identifying a different interaction weight for the interaction based on a degree to which the interaction decreases a security risk of disclosing sensitive information associated with the user account.

16. The system as recited in claim 11, further comprising instructions that, when executed by the at least one processor, cause the system to:
  generate, based on the digital-media-proficiency metric for the user, additional digital content associated with one or more user-interaction evaluations;
  provide, to the user account, the additional digital content within a separate instance of the social networking platform;
  detect, within the separate instance of the social networking platform, one or more additional interactions between the user account and the additional digital content; and
  generate, in connection with the separate instance of the social networking platform, a separate digital-media-proficiency metric for the user based on the one or more additional interactions between the user account and the additional digital content.

17. The system as recited in claim 11, further comprising instructions that, when executed by the at least one processor, cause the system to generate the digital-media-proficiency metric for the user by:
receiving a social networking post generated by the user account of the user for publishing to one or more users of the plurality of users via the social networking platform;
generating a content score for the social networking post generated by the user account of the user based on digital content in the social networking post; and
generating the digital-media-proficiency metric for the user further based on the content score.

18. A method comprising:
receiving, by at least one processor, a request to initiate a digital media bot as part of a user-interaction evaluation for digital media proficiency in a social networking platform comprising a plurality of users;
based on receiving the request, generating, by the at least one processor, digital content by executing the digital media bot to perform one or more digital media actions associated with the user-interaction evaluation within the social networking platform;
detecting, by the at least one processor and within the social networking platform, an interaction between a user account associated with a user of the plurality of users and the digital content generated by executing the digital media bot; and
generating, by the at least one processor, a digital-media-proficiency metric for the user based on the interaction between the user account and the digital content generated by executing the digital media bot.

19. The method as recited in claim 18, wherein generating the digital-media-proficiency metric for the user comprises:
generating an interaction score for the interaction based on a content score for the digital content and an interaction weight associated with the interaction; and
generating the digital-media-proficiency metric for the user based on the interaction score.

20. The method as recited in claim 19, wherein generating the digital-media-proficiency metric for the user comprises:
generating additional digital content by executing a plurality of digital media bots as part of a plurality of user-interaction evaluations for digital media proficiency in the social networking platform; and
generating the digital-media-proficiency metric for the user further based on:
interactions between the user account and the additional digital content generated by executing the plurality of digital media bots; and
interactions between the user account and one or more additional user accounts associated with one or more additional users of the plurality of users.

* * * * *